Figure 13:
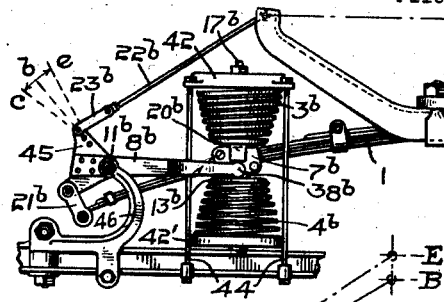

April 12, 1927.
F. L. O. WADSWORTH
1,623,986
SPRING SUSPENSION FOR VEHICLES
Filed Jan. 20, 1921  5 Sheets-Sheet 1
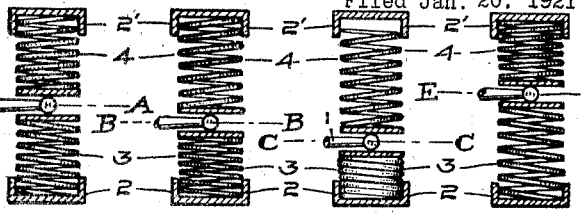
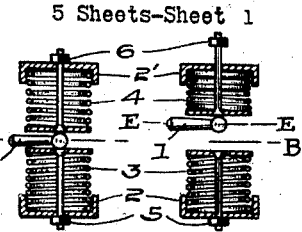
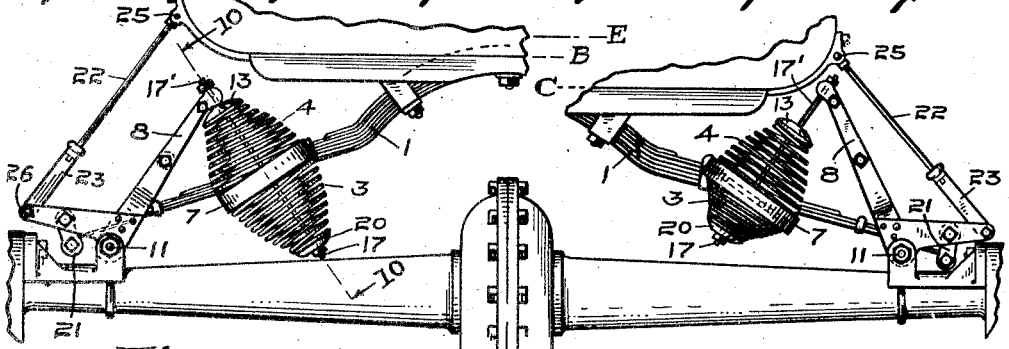
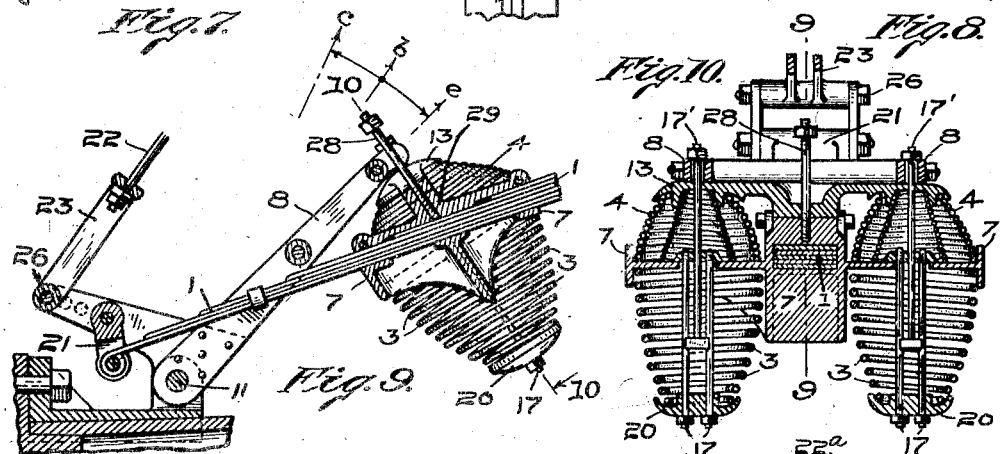
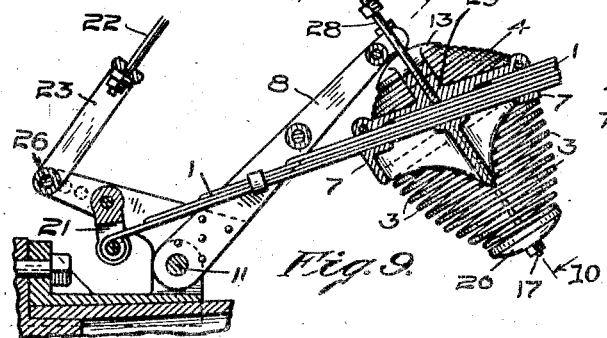
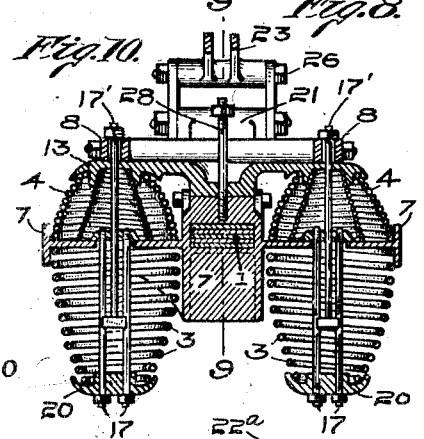
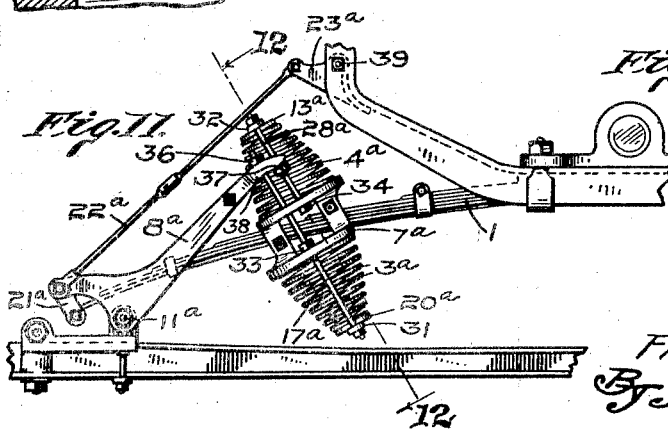
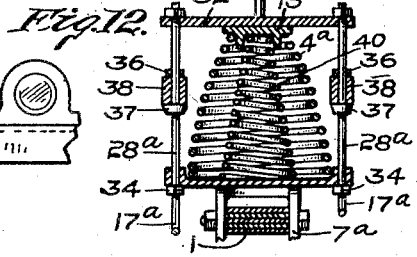
INVENTOR:
FRANK L. O. WADSWORTH,
By Frank W. Hoerner
ATTORNEY.

April 12, 1927.

F. L. O. WADSWORTH

SPRING SUSPENSION FOR VEHICLES

Filed Jan. 20, 1921  5 Sheets-Sheet 2

INVENTOR
FRANK L. O. WADSWORTH
By Frank H. Woermer
ATTORNEY.

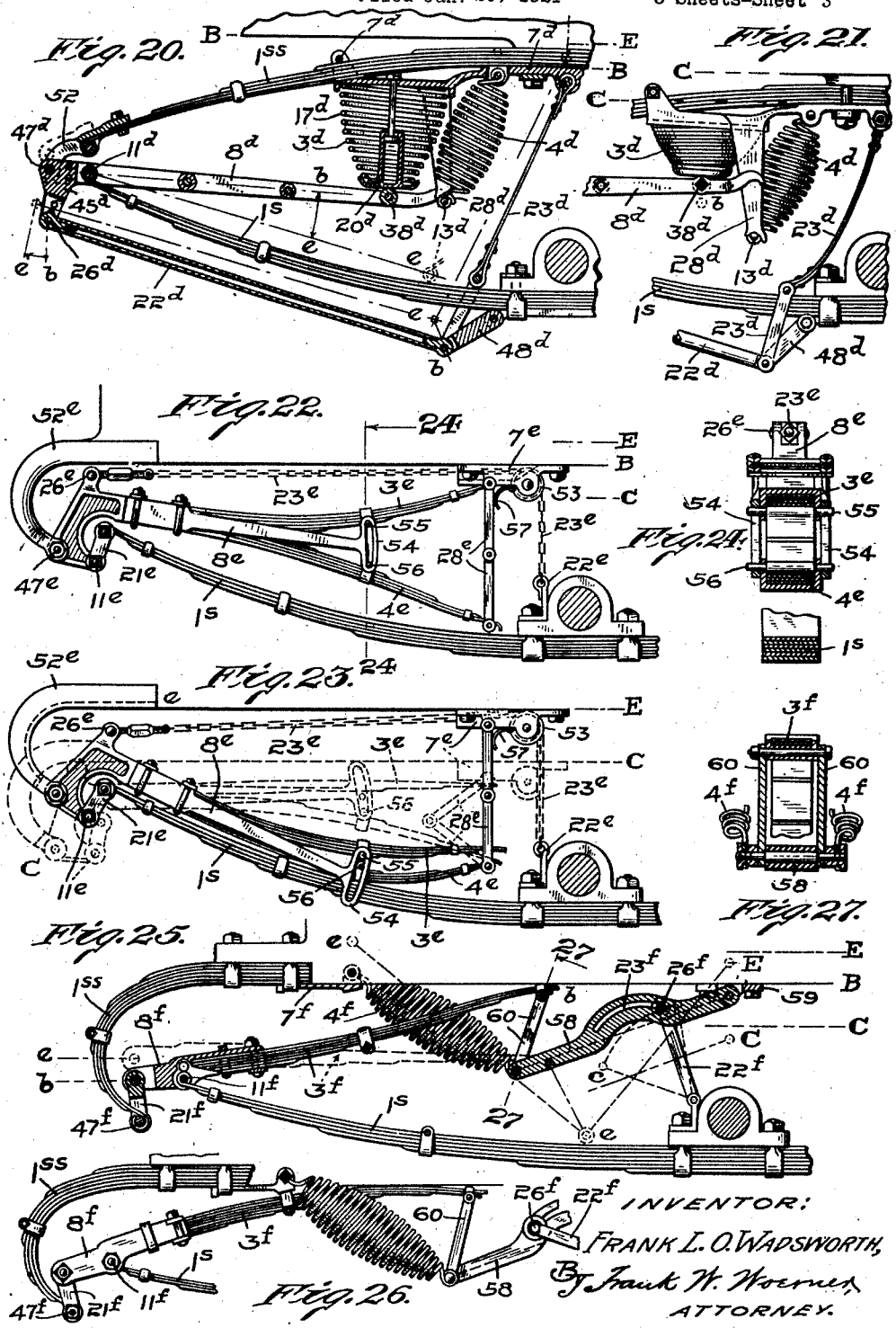

April 12, 1927.  F. L. O. WADSWORTH  1,623,986
SPRING SUSPENSION FOR VEHICLES
Filed Jan. 20, 1921    5 Sheets-Sheet 4
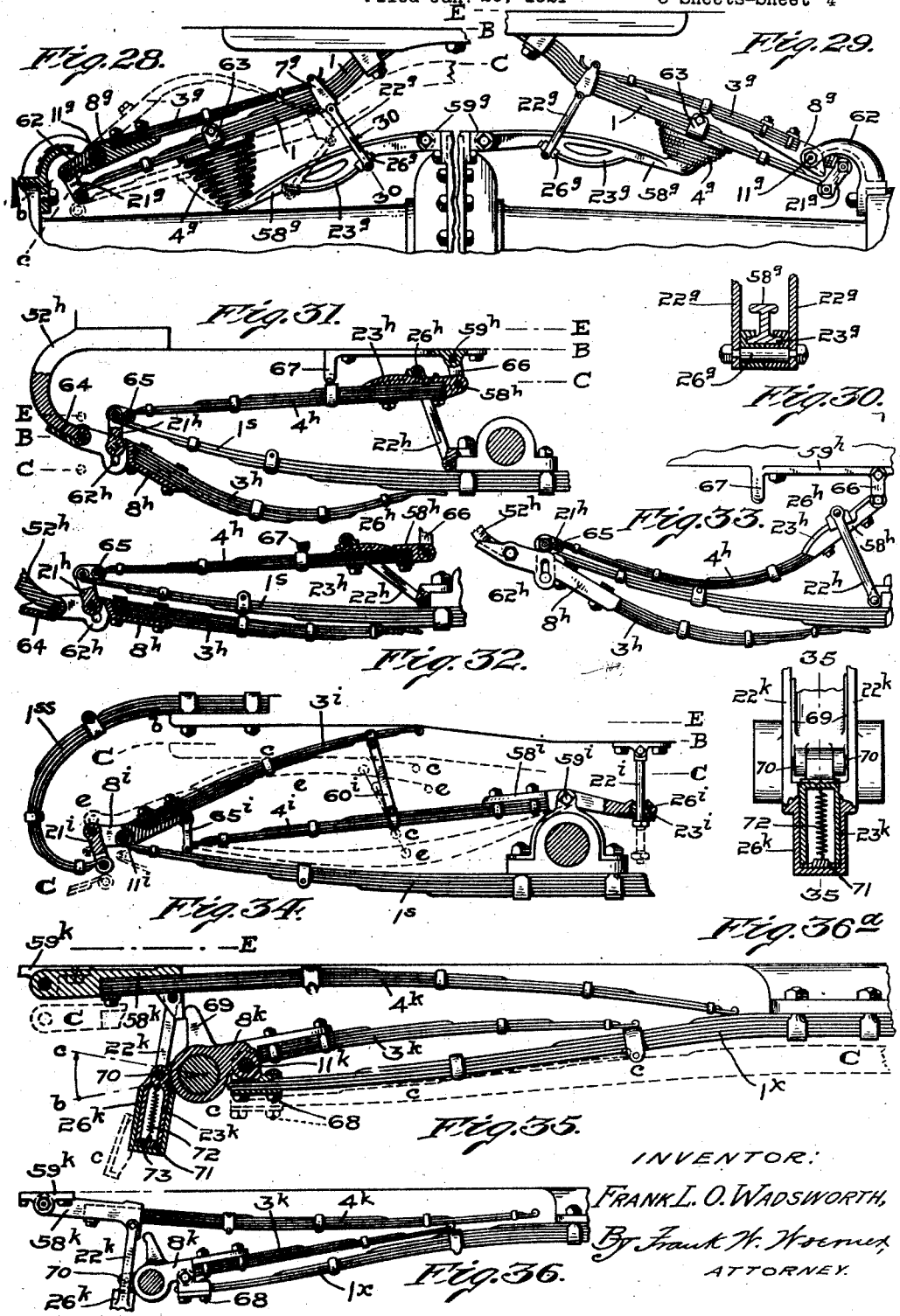
INVENTOR:
FRANK L. O. WADSWORTH,
By Frank W. Werner
ATTORNEY.

April 12, 1927.
F. L. O. WADSWORTH
1,623,986
SPRING SUSPENSION FOR VEHICLES
Filed Jan. 20, 1921   5 Sheets-Sheet 5
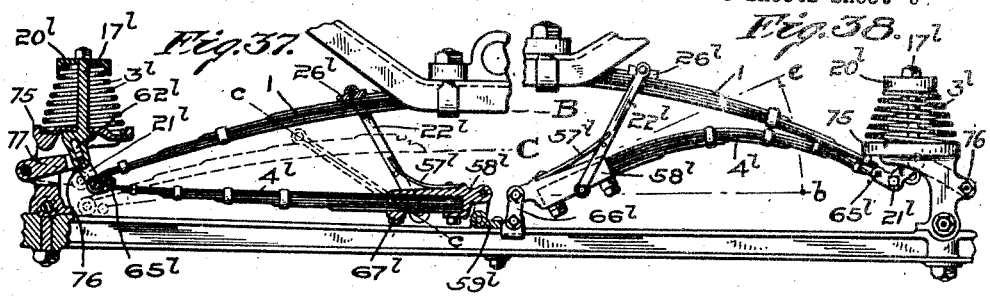
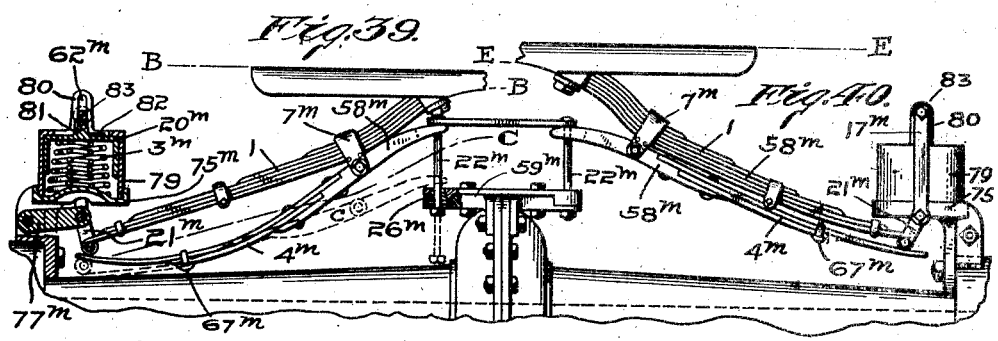
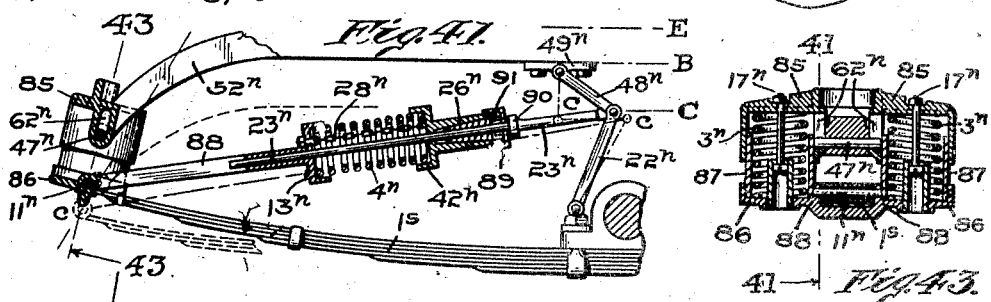
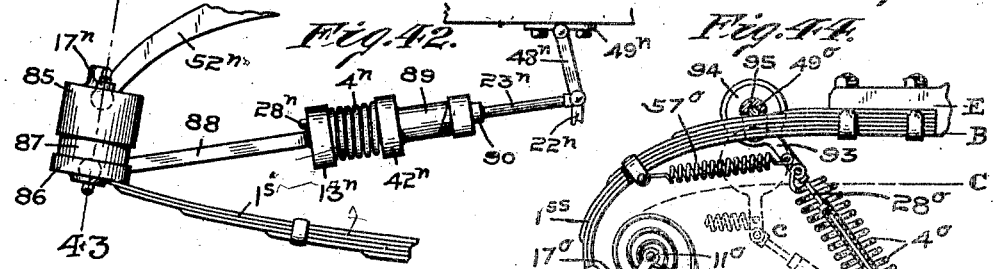
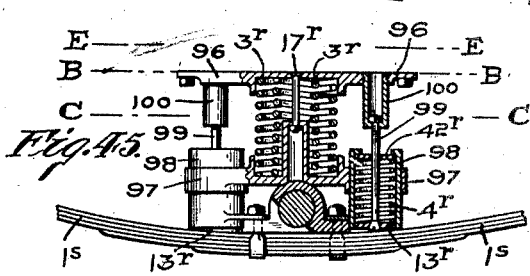
INVENTOR:
FRANK L. O. WADSWORTH,
By Frank W. ...
ATTORNEY.

Patented Apr. 12, 1927.

1,623,986

UNITED STATES PATENT OFFICE.

FRANK L. O. WADSWORTH, OF PITTSBURGH, PENNSYLVANIA.

SPRING SUSPENSION FOR VEHICLES.

Application filed January 20, 1921. Serial No. 438,597.

My invention relates to elastic shock absorber organizations of the multiple supplemental spring type, in which one of the secondary resilient elements of the combination is utilized to assist in resisting and absorbing the effects of kinetic compression shocks, and another structurally independent spring is employed to resist and restrain the disagreeable and ofttimes dangerous rebound and "tossing" action that results from the recoil or separation of the spring connected parts. Organizations of this character are generally referred to as counteracting-spring systems, for the reason that the elastic elements which respectively resist the closing or the compression, and the expansion or rebound, of the relatively movable members, act in opposite directions, and are generally so connected as to oppose each other in the intermediate or central portions of the oscillatory movement. As contrasted with a single-acting-supplemental-spring system— which is only adapted to assist in restraining one way displacements (either of compression or separation) from normal load position—a counteracting spring suspension presents the advantage of securing a more rapid and effective checking and absorption of the recoil or return oscillations of the stressed parts; and as contrasted with a double-acting-supplemental-spring construction—which utilizes the direct or the reversed flexure of the same resilient member to check the double movements, of both compression and rebound, from the loci of static equilibrium—the counteracting-spring-system presents the possibility of securing a wider range of relative restraint to the reversed movements of the suspended parts, and of also utilizing different forms, as well as different strengths, of spring elements for respectively resisting the effect of compressive shocks and of recoil and rebound stresses. The counteracting-supplemental-spring combination also possesses the advantage of being able to efficiently perform certain of its intended functions even when one of its resilient elements is injured or destroyed. On the other hand, the usual forms of counteracting-spring construction heretofore used, are open to the objection that the elastic restraining action of both elements is diminished—and for certain parts of the oscillatory movement is entirely destroyed—by the balanced effect of the opposing springs; and the position of static equilibrium (under normal load stresses) is disturbed by any injury to, or relative weakening of, one of the dual balancing elements.

One of the purposes of my present invention is to produce a counteracting-spring combination which has all of the advantages ordinarily presented by this type of construction, and which is free from the objection last mentioned. In order that this feature of my improvements may be more easily and clearly understood I will first briefly refer to Figs. 1 to 6 of my drawings which illustrate diagrammatically the usual action of an ordinary counteracting-spring system and the manner in which this action is characteristically modified by the application of my invention thereto. In these illustrations, 1 indicates a member that may be attached to, or oscillated by, one of the relatively movable parts of a chassis frame—e. g., the body or tonneau member thereof—2—2' indicate members that are carried on the other of the said relatively movable parts—e. g., on the axle frame— and 3—4 are the two counteracting springs which are interposed between the relatively movable parts, 1—2—2', and which serve to resist, respectively, the relative approach and the relative separation of the members 1 and 2. When the spring supported parts are unloaded, or free from stress, the member 1 assumes a position, (A), such as is shown in Fig. 1, in which the tension or flexural strain in one spring is just balanced by that in the other; and under such conditions the elastic system does not offer any substantial resistance to small displacements of the parts in either direction. In other words, there is a certain range or field of oscillatory movement, on the two sides of position A, within which the balanced spring combination is inoperative, or ineffective, in checking or restraining the relative displacement of the spring connected members. When the body supports (1) are subjected to load stress they are forced toward the axle frame members (2) thereby compressing the spring, 3, and permitting the opposing spring 4 to expand. Under a normal fixed load the parts of the system will assume a position of static equilibrium, B, which is diagrammatically illustrated in Fig. 2, in which the imposed tension on the lower spring 3 just balances the combined compression stress of the fixed load and the residual expansion stress of the upper spring 4. If now the relatively movable members 1—2—2' are subjected to an increased kinetic stress—due to a temporarily imposed shock of road travel—which acts in the same direction as the normal load, the spring 3 will be further compressed and the spring 4 will be permitted to correspondingly expand or recoil; and the parts of the system will assume the position, C, shown in Fig. 3. When the increased kinetic load is removed the abnormally compressed spring 3 will recoil or expand, and will act to return the members to their normal static load position (B, Fig. 2); but the kinetic inertia of the moving members will carry them beyond this point of equilibrium toward the position A of Fig. 1; and if the initial compression, and the following rebound movement, is excessive the separation of the spring connected parts will continue until it is arrested by the joint action of gravity and the continued compression of the upper spring 4—as shown in Fig. 4. But during the movement between the two positions B and E—through the point of balance A of the unloaded system—the counteracting elements 3—4 offer very little effective resistance to the relative motion of the members 1, and 2—2', in either direction; and there is therefore a comparatively free oscillation of the elastically suspended parts over a considerable range of displacement.

Figs. 5 and 6 illustrate, diagrammatically, the means which I employ to eliminate this balancing effect of the two counteracting spring elements, and thereby secure an immediate effective action of the said springs in resisting and checking any displacement, in either direction, from the normal static load position B. These means comprise two positive stop members—e. g., the check bolts 5 and 6—which prevent any reflexing, or expansion, of either spring, 3 or 4, beyond the point of initial compression to which it is subjected when the parts are in static equilibrium. When the members 1 and 2 are separated, the stop 5 prevents the spring 3 from following the relative upward movement of the part 1, and the upper spring 4 is thereby able to exert its full force of initial and increased compression in quickly checking such a rebound movement (see Fig. 6). Conversely any compression of the system results only in an increased positive flexure of the lower spring 3, as the stop member 6 prevents any expansion of the upper spring beyond the position shown in Fig. 5; and the full effect of the resultant unbalanced tension in this lower spring is available in resisting and restraining the relative approach of the members 1 and 2. This feature of my improvements not only eliminates the concurrent counteractive effects of the opposing springs—(which, as already explained, permit of the substantially unrestrained oscillation of the relatively movable members over a considerable range of displacement from normal load position)—but also greatly reduces the space required for the installation of a spring system of the necessary predetermined resistance and shock absorbing capacity—as shown by a comparison of Figs. 1 to 4 with Figs. 5 and 6.

Another important object of this invention is the kinematical arrangement of main and supplemental spring elements in such cooperative relationship that the flexure of the supplemental springs tends in all cases to supplement the positive, or increased bending of the main spring, and to prevent, or resist, any negative, or reverse flexure of that primary elastic element. This feature of improvement is of decided advantage in reducing the danger of breaking, or permanently distorting, the main suspension member of the combination by excessive or abnormal bending strains.

Another special feature of my present invention is the provision of certain organizations of multiple spring elements which are primarily counteractive in effect, but which are secondarily supplemental in mutual action; so that certain elements of the complete combination may be utilized to strongly resist a compression of the system and to also restrain, in lesser degre, the expansion of the parts, while other elements thereof are chiefly employed in checking the rebound movements but also have an auxiliary action in opposing and absorbing compressive shocks. This feature of my improvements further increases the capacity of a multiple spring system, by the simultaneous and cooperative use of all of the elastic elements of the combination.

A second special feature of my present improvements is the provision of a multiple supplemental spring combination in which different elements are alternately and independently used to resist successive movements of the parts in opposite directions from normal load position; and which also embodies means for securing an advanced or prenormal flexure of one set of elements whereby the recoil of the other set from their compressed positions is substantially retarded. This feature of my invention is particularly useful in reducing the rapidity and the magnitude of rebound movements from positions of abnormal or excessive displacement.

Still other specific characteristics of my improved shock absorber organization will be made apparent by the detailed consideration of the various illustrative embodiments and applications of the present invention which are shown in the accompanying drawings, in which:

Fig. 7 is a rear elevation of the left hand side of the rear cross leaf spring suspension of a Ford car, equipped with one form of my new shock absorber organization; Fig. 8 is a similar view of the right hand side of the construction shown in Fig. 7, but with the parts in the position which they assume under compressive shocks; Fig. 9 is an enlarged sectional elevation on the plane 9—9 of Fig. 10—of this same construction with the parts in rebound position; Fig. 10 is a sectional elevation on the plane 10—10 of Fig. 9; Fig. 11 is a front view of another exemplification of my improvements as applied to a front cross leaf spring; and Fig. 12 is a partial cross section on the plane 12—12 of Fig. 11.

Figure 14:
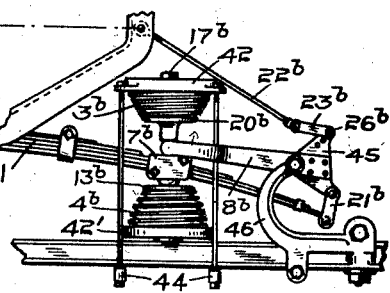
Figure 15:
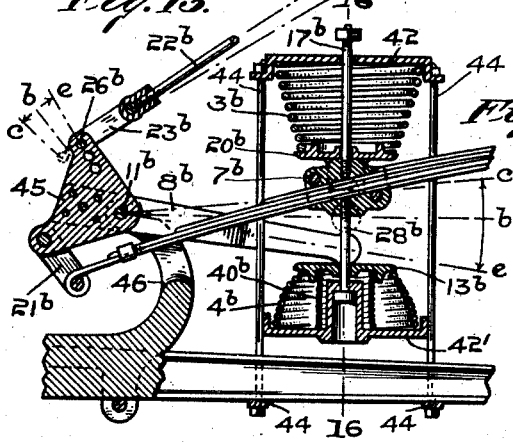
Figure 16:
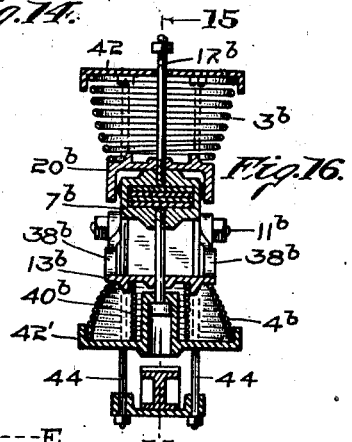
Figure 17:
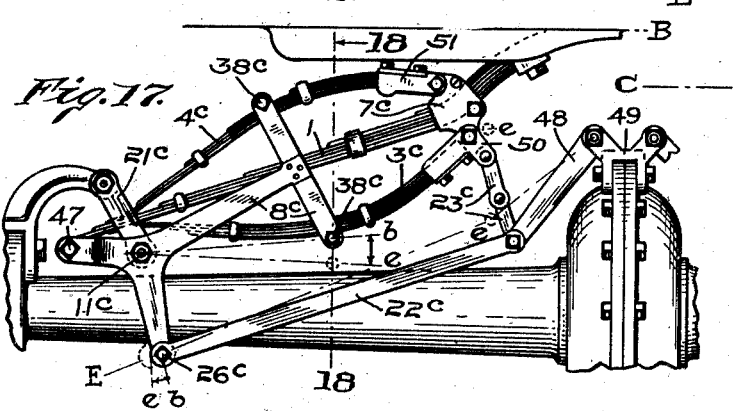
Figure 18:
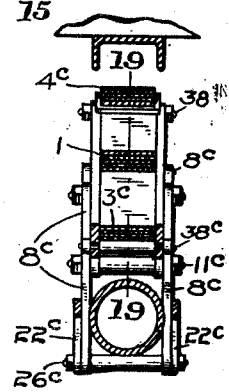
Figure 19:
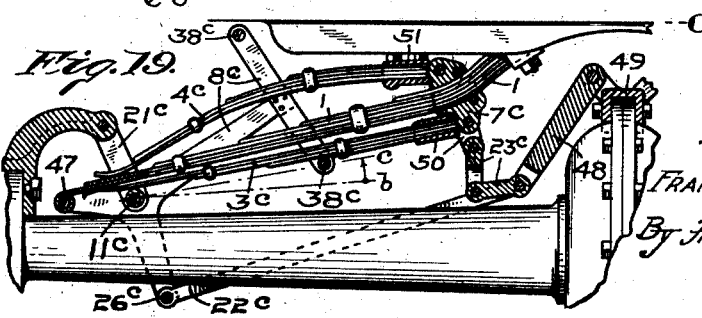

Fig. 13 illustrates a third form of my improved spring structure mounted on the front axle support of a Ford car; Fig. 14 is another view of this same structure showing the parts in the position which they assume under kinetic compression shocks; Fig. 15 is a partial sectional elevation on the central vertical plane—i. e., the plane 15—15 of the construction shown in Fig. 16, with the members thereof in rebound position; Fig. 16 is a cross sectional view on the plane 16—16 of Fig. 15; Fig. 17 is an elevation of another multiple spring suspension for the rear axle support of a Ford car; Fig. 18 is a vertical section on the plane 18—18 of Fig. 17; and Fig. 19 is a central sectional elevation of this construction (as on the plane 19—19 of Fig. 18) showing the position and action of the parts when subjected to kinetic compression shocks.

Fig. 20 is a side elevation—partly in section—of a fifth illustrative embodiment of my invention as applied to an ordinary full elliptic leaf spring suspension; Fig. 21 is a second view of a portion of the structure shown in Fig. 20, with the parts thereof in the position which they assume under an increased compression stress; Fig. 22 illustrates an application of my improvements to a semi-elliptic side leaf spring support; Fig. 23 is another view of this same construction showing the action of the mechanism in resisting displacements in either direction from the normal load position of Fig. 22; Fig. 23 is a sectional elevation on the plane 24—24 of Fig. 22; Fig. 25 is a view, similar to that of Fig. 20, and illustrates an embodiment of my invention in a three-quarter-elliptic, or scroll, spring suspension system; Fig. 26 is a partial side elevation of the structure shown in Fig. 25 with the parts in the position which they occupy when under kinetic compression; and Fig. 27 is a sectional elevation on the plane 27—27 of Fig. 25.

Fig. 28 is a rear view—in partial section on the central vertical plane of the spring suspension—showing another species of my generic invention applied to a cross leaf main spring; Fig. 29 is an elevation of this embodiment of my multiple auxiliary spring construction and shows the action of the parts thereof when they rebound from the normal load position that is depicted, in full lines, in Fig. 28; Fig. 30 is a detail sectional view on the plane 30—30 of Fig. 28; Fig. 31 is a sectional elevation of another embodiment of my improvements in a semi-elliptic side leaf spring suspension; Fig. 32 is a view, similar to that of Fig. 31, showing the parts of that structure in the position which they occupy when subjected to an increased compressive stress; Fig. 33 is a side elevation which illustrates the section of this same mechanism when the members thereof rebound from the positions shown in Figs. 31 and 32; Fig. 34 is a sectional elevation—similar to those of Figs. 31 and 32—of another multiple-leaf-spring organization that embodies my improvements; Fig. 35 is also a sectional elevation (on the central vertical plane 35—35 of Fig. 36ª), that illustrates the application of my invention to a cantilever-leaf-spring suspension for either the rear or the front axle of a motor vehicle; Fig. 36 is a partial side elevation of the construction shown in Fig. 35 with the parts thereof in rebound position; and Fig. 36ª is an enlarged detail view of a portion of the structure depicted in Figs. 35 and 36.

Fig. 37 is another sectional view—on the central vertical plane through a cross leaf spring support—which illustrates a further embodiment of my generic improvements; Fig. 38 is a front elevation of this construction and shows the action of the system when the parts rebound above the normal load position of Fig. 37 (full lines); Fig. 39 is a view, similar to that of Fig. 37, of another exemplification of my invention; Fig. 40 is a rear elevation of the organization shown in Fig. 39 with the parts in rebound position; Fig. 41 is a composite sectional elevation—partly on the central vertical plane of the suspension system and partly on the plane 41—41 of Fig. 43—which illustrates still another utilization of my improvements in a semi-elliptic side leaf spring suspension; Fig. 42 is a side elevation showing the parts of Fig. 41 in the position assumed by them under rebound stress; Fig. 43 is a sectional view on the plane 43—43 of Figs. 41—42; Fig. 44 is a side elevation—partly in section—of a further illustrative embodiment of my present improvements as applied to a three-quarter-elliptic spring support; and Fig. 45 is a sectional elevation illustrating the use of certain features of my invention in conjunction with a semi-elliptic side leaf spring.

The construction shown in Figs. 7—8—9 and 10 of my drawings comprises two pair of conical volute, or "beehive" springs 3—3 and 4—4 that are mounted symmetrically, on the opposite edges of the main spring 1, in the recessed sides of the clip bracket 7; and a double arm lever member 8—8, which is pivotally mounted on an axle perch bolt 11, and is operatively conjoined with the opposite ends of the supplemental springs, 3—3 and 4—4, respectively, by means of the upper follower plate 13 and by means of the stirrup and T bolt connections 17—17' and the bottom follower plates 20—20. The outer portions of the lever arms 8, 8—which are preferably formed of separate plates that are riveted or otherwise suitably secured to the inner portions of said arms (as shown in Figs. 7, 8 and 9)—are coupled to the end eye of the main spring 1, by a forked shackle link 21; and are also conjoined to the main body portion of the vehicle by means of the sliding bolt and stirrup link connections 22—23 and the pintle bolts 25 and 26. The lower springs 3—3 are confined under a predetermined degree of initial tension, which is sufficient to balance the static load pressure on the inner end of the lever member 8—8, and are prevented from expanding beyond this tensioned position, by the engagement of the elongated heads of the stirrup bolts 17—17 with the upper sides of the spring clip bracket. The upper springs 4—4—which may, if desired be reinforced by a pair of inner coils as shown in Fig. 10—are also maintained under a predetermined initial tension by means of a stop bolt 28, that is secured at its lower end to the bracket 7 and is slidably engaged at its upper end with the top follower plate 13. The relative elastic resistance and working capacities of the two sets of springs, 3—3 and 4—4, may be initially varied to meet any desired conditions of operation; and the predetermined tensions under which they are maintained at normal load position may be altered, at will, by means of the nuts on the bolts 17—17' and 28. In most cases these connections are so adjusted that when the parts are in static equilibrium (see Fig. 7) the lever member 8—8 is in operative engagement with both the upper and the lower follower plates 13 and 20—20, and any movement of this member will be accompanied by an increased compression of one or the other of the two sets of springs 3—3 and 4—4. The secondary connection 22—23 is likewise so adjusted as to establish a tensioned engagement between the lever 8 and the body member of the vehicle when the parts are in the normal load position of Fig. 7.

Under the conditions just mentioned the operation of the above described combination is as follows: When the suspension system is subjected to an increased kinetic stress or load, which tends to force the main spring and axle members toward each other, the lever member 8—8 will be rocked upwardly, on the axle perch pivot bolt 11, thereby lifting the lower follower plates 20—20 and compressing the supplemental springs 3—3 against the underside of the main spring bracket 7. During this movement the upper springs 4—4 will be prevented from expanding by the action of the stop bolt 28, and will therefore be prevented from retarding, or affecting in any way, the restraining action of the progressively flexed lower springs 3—3. The movement may be continued until the outer ends of the lever arms come in contact with the adjacent part of the axle perch bracket, or the brake drum to which it is bolted (as shown in Fig. 8); after which the angular motion of the member 8 is arrested, and any further approach of the connected parts is resisted and checked by the flexure of the main spring, which is now reinforced and greatly stiffened in action by the upward thrust of the tightly compressed coils 3—3. When the increased load stress is relieved the flexed springs will recoil and tend to throw the parts beyond and above the initial position of static equilibrium (Fig. 7). But as soon as this position is reached the further expansion of the compressed coils 3—3 will be arrested by the action of the stirrup bolts 17 (as already explained), and the effect of those springs in producing rebound will thus be eliminated. At the same time the lever member 8 is operatively coupled to the main body by the tensioned engagement of the sliding connections 22—23; and any separation of the body and axle parts then imposes an upward pull on the outer ends of the lever and of the main spring, and rocks the inner end of the member 8 downwardly toward the upwardly moving bracket support 7. This action subjects the upper supplemental spring elements, 4—4, to a progressively increased flexural stress and strain which reacts downwardly against the intermediate flexible portion of the main spring 1; and it also concurrently lifts the outer extremity of this spring by substantially the same amount as the body movement. These joint and cooperative effects very effectively resist, and quickly check, any rebound or "overthrow" of the relatively movable members; and also prevent any sensible reflexing or expansion of the main spring beyond its normal load form during such rebound movements. Under supernormal conditions the recoil movements may be so violent as to produce an excessive compression of the upper springs 4—4; and in order to prevent this the clip bracket 7 is provided with a central boss 29, which is adapted to engage with the crossbar of the upper follower head 13 and thereby lock the members 7 and 8 against further movement toward each other. When this occurs the further separation of the body and axle parts imposes a rapidly increased flexure on the main spring—which is then concurrently lifted at its center and ends and pressed downward at the points on which the brackets 7—7 are mounted—and this will very quickly arrest and absorb the final effects of an abnormal "overthrow" or rebound of the suspension system.

The outer arms of the lever member 8 may be provided with a slot, or with a series of holes, (as indicated in dotted lines in Fig. 9) for the purpose of varying the position of the pivot bolt 26, and thereby altering the relation between the separation of the body and axle members and the resultant angular swing of the lever. This alteration will in turn vary the relative movement of the center and ends of the main spring, and thereby modify the ratio of the concurrent flexures of the primary and secondary elastic elements; but in all cases the kinematical arrangement is such that all of the springs—the main leaf spring as well as the helical coil supplemental springs—are maintained under some initial compression and are prevented from ever recoiling or expanding beyond that position of predetermined initial flexure. The result of this arrangement is that the elastically suspended parts are not subjected to the usual "tossing" action that follows the sudden flexing and subsequent reverse recoil and overthrow of free unrestrained spring supports; but are, on the contrary always held against any displacement from the normal position of static balance by the positive flexural resistance of the main spring and of one of the sets of supplemental springs. And the utilization of two, or more, auxiliary elastic elements, for separately restraining and checking compression and rebound actions, makes it possible to impose, if desired, a widely varied resistance to those respective movements without altering the form or character of the usual main spring suspension members. In general I prefer to make the rebound-check-supplemental-spring member considerably stronger, or stiffer, than the counteracting auxiliary member which resists compression—e. g., by making the springs, 4—4, of heavier wire, or by reinforcing them by additional inner coils as shown in Fig. 10—for the joint purposes of securing a powerful and quick restraint on rebound movements without sacrificing the desired sensitiveness of the system under compressive shocks, and of also exercising a magnified reaction pressure on the intermediate flexible portions of the main spring and thereby more effectually preventing any possible reflexing or expansion of this member beyond its normal load form.

The construction shown in Figs. 11 and 12 corresponds very closely to that first described. It comprises two counteracting auxiliary springs 3ª and 4ª, which are mounted on a common bracket support 7ª—7ª, that is clipped to an intermediate portion of the main spring 1 at a point about midway its center and end. These springs are maintained under a predetermined initial tension, and prevented from expanding beyond the normal load position shown in Fig. 11, by means of the two pairs of bolts 17ª—17ª, and 28ª—28ª, which are connected at their opposite ends with the two follower plates 20ª and 13ª—by means of the cross bars or yokes, 31, 32, respectively—and are provided with heads and collars (marked 33 and 34 respectively) that engage with the bracket clip 7ª and limit the longitudinal movement of the said bolts with respect thereto. These bolts are also provided with a second set of heads and collars 36 and 37 which are so positioned as to be engaged by the forked inner ends 38 of double arm lever 8ª. This lever member is pivotally supported, at an intermediate point in its length, on the axle perch bolt 11ª, and is coupled at its outer end to the extremity of the main spring (by shackle links 21ª), and also to the body of the vehicle by the adjustable rod and bracket link connectors 22ª—23ª—39.

The axes of the counteracting auxiliary springs, 3ª and 4ª, are preferably offset, as shown in Fig. 11, for the double purpose of enabling their bases to be brought nearer together, and of increasing the effective resistance of the rebound-check-spring 4ª to the angular movement of the lever 8ª. The elastic restraint resistance of the upper auxiliary spring is further augmented by the addition of the inner coil 40 (as shown in section in Fig. 12); so that this system—like that shown in Figs. 7 to 10 inclusive—will impose a considerably greater check on any rebound oscillation (and will also act more strongly in limiting the reflexing or expansion of the main spring) than it does on compression movements.

The functional operation of the combination last described is precisely the same as that of the construction first considered, and does not, for that reason, require any extended explanation. When the body and axle parts approach each other the lever 8ª is rocked upwardly on its axle bolt support and lifts the lower follower plate 20ª—thereby compressing the spring 3ª against the under face of the main spring 1—until the collars 33 engage with the base plate of the upper spring and thereby lock the bolts 17ª against further sliding movement therethrough. In this action the bracket 23ª swings outwardly on its pivot bolt 39 to accommodate the longitudinal movement of the connector 22ª. When the body and axle parts separate from one another—(beyond the position of static balance shown in Fig. 11)—the bracket 23ª is locked against its body support and an upward pull is transmitted, through the rod $22^a$, to the outer extremities of the lever $8^a$ and the main spring 1; and the inner end of the lever is depressed—thereby compressing the upper coils $4^a$ and 40 against the upwardly moving main spring support—until this action is in turn arrested by the engagement of the collars 37 with the base plate of the upper spring. When the movements, in either direction, exceed those which can be accommodated by a corresponding elastic flexure of the supplemental or auxiliary springs, $3^a$ or $4^a$—40, the positive flexure of the main spring—reinforced and stiffened in its resistance by the reactive pressures of the tightly compressed secondary units—is brought into play to quickly arrest and absorb the residual or unchecked portions of the said movements.

In the organization which is illustrated in Figs. 13 to 16 inclusive the counteracting supplemental spring units are made up of a single volute coil $3^b$ placed above the intermediate flexible portion of the main cross leaf spring 1, and a pair of helical coils $4^b$ and $40^b$ which are positioned vertically below and in axial alignment with the upper coil. The upper spring is confined between two follower plates $20^b$ and 42, and the lower coils are correspondingly confined between the opposed follower heads $13^b$ and $42'$. Each of the follower heads $20^b$ and $13^b$ are adapted to slide longitudinally on a stop bolt—(marked $17^b$ and $28^b$ respectively)—which is secured to the main spring clip $7^b$ and is provided with a head that engages with the opposed follower plate (42 or $42'$) and limits the opening or expansion movement of the confined spring. In the normal load position of the parts (see Fig. 13) the lower follower plate rests on the top of the axle frame, and the upper follower plate is held in tensioned engagement therewith by two adjustable stirrup bolt connections 44—44. The adjacent faces of the follower plates $20^b$ and $13^b$ are detachably engaged with the inner ends of the lever arms $8^b$, and the latter are riveted, or otherwise suitably secured, at their outer extremities, to a triangular spacing block 45, which is pivotally coupled, at its three vertices, with the axle perch (by the pintle bolt $11^b$), with the extremity of the main spring (by the shackle links $21^b$), and with the main body portion of the vehicle (by the tension rod-and-link connections $22^b$—$23^b$).

When the organization shown in Fig. 13 is subjected to an increased kinetic compression stress the parts thereof are moved from the normal load positions (B—b) to the positions, C—c, shown in full lines in Fig. 14 and partially indicated in dotted lines in Figs. 13 and 15. In this movement the inner end of the lever $8^b$ is rocked upwardly, thus lifting the follower head $20^b$ away from its engagement with the central clip support $7^b$, and compressing the upper spring against the upper follower head 42 which is concurrently moved downward with the main spring by reason of its stop bolt and clip connection ($17^b$—$7^b$) therewith. The movement of the body and main spring toward the axle support is also resisted, to a smaller degree, by the direct compression of the lower coils $4^b$—$40^b$ between the heads $13^b$ and $42'$ which are then respectively engaged by the under side of the clip $7^b$ and the upper face of the axle frame. This lever controlled flexure of the auxiliary spring unit $3^b$ may continue until the compression of the system brings the lower face of the main spring into pressure contact with the cross rib 46 of the forked axle perch; after which the further approach of the oscillating members is quickly checked by the augmented bending resistance of the primary suspension member which is reinforced by the further direct compression of the lower coils $4^b$ and $40^b$. When the increased kinetic stress is relieved the flexed springs will recoil and return the parts to their initial position of static balance (B—b); but when this position is reached the connector elements $22^b$—$23^b$ are brought into tensioned engagement with the lever and body members, and the upper follower plate 42 is simultaneously locked in fixed relation to the axle frame by the stirrup bolts 44—44. If the momentum of the recoil movement—or any other stress of separation—is sufficiently great to move the body and axle members away from each other from position B—b toward the positions E—e (as shown in full lines in Figs. 15 and 16 and as partially indicated in dotted lines in Fig. 13); the outer ends of the lever arms $8^b$, and of the main spring 1, will be lifted by the pull of the connections $22^b$—$23^b$ etc.; and the auxiliary rebound-check-springs ($4^b$—$40^b$) will be compressed between the head $13^b$ which is being carried down by the swinging lever, and the head $42'$ which is being concurrently lifted by the oppositely moving main spring clip $7^b$. The elastic restraint thus imposed on the kinetic expansion of the system is augmented by the lesser direct compression of the upper coil $3^b$ between the follower plates $20^b$ and 42 which are respectively fixed with respect to the oppositely moving main spring and axle members. In this action the cooperative downward pressure of both of the auxiliary spring units ($4^b$—$40^b$ and $3^b$) on the intermediate flexible portion of the upwardly moving main spring, combined with the simultaneous upward pull on its outer end, resists any tendency of the said main spring to abnormal recoil, and prevents any reflexing or expansion of this element beyond its normal load form, under the most severe and excessive rebound stresses. In order to prevent undue compression of the lower springs, under such conditions, the follower plate 42′ is provided with a recessed central boss that will engage with the lever actuated head, 13$^b$, at a predetermined point in the separation of the body and axle parts (as shown in Figs. 15 and 16) and arrest the flexure of the auxiliary coils, 4$^b$—40$^b$, without interfering with the continued cooperative action of the upper coil 3$^b$, and of the reinforced and stiffened main spring, in checking a further abnormal rebound movement.

Figs. 17, 18 and 19 present another exemplification of my invention, which is quite different in form, but which is substantially identical in action with the double-counteracting spring construction shown in Figs. 13 to 16 inclusive. In this fourth illustrative embodiment of my improvements the auxiliary spring system consists of two very flexible leaf springs 3$^c$ and 4$^c$, which are pivotally mounted, at their inner ends, on a main spring clip, 7$^c$; and which bear, at their outer ends, on the opposite faces of the main spring 1. The intermediate portions of the supplemental spring units, 3$^c$—4$^c$, are operatively engaged by the spacer bolts 38$^c$—38$^c$ which also serve to structurally unite the inner ends of a double-arm-T-shaped lever frame 8$^c$. The outer extremities of the lever arms are likewise joined together by means of spacer bolts 11$^c$, 47, and 26$^c$, which act as pivot pins for flexibly coupling the unitary lever frame with the axle perch links 21$^c$, the end eye of the main spring 1, and the rebound control connections 22$^c$, respectively. In this construction the links 22$^c$ are carried, at their inner ends, on a radius arm 48 that is pivotally mounted on a bracket 49, secured to the central differential gear case of the rear axle; and the elbow pin connection between the members 22$^c$—22$^c$ and 48 is coupled to a pivot block arm 50 on the inner end of the leaf spring 3$^c$ by means of the collapsible chain links 23$^c$. When the parts are in normal load position— as shown in full lines in Fig. 17—both of the auxiliary leaf springs are confined, under the predetermined initial tension, between the cross head bolts 38$^c$—38$^c$; and they are so set relatively to the main spring (by shifting the clip support 7$^c$) that the top of upper-auxiliary-spring-pivot-block 51 is then in pressure engagement with the main body frame. In this position the angular relationship of the toggle arms, 22$^c$ and 48, is adjusted (as by raising or lowering the bracket support 49) until the links 23$^c$—23$^c$ are under a slight tension.

Under such conditions of adjustment as have just been described the functional action of the organization in resisting displacements from the normal load position is as follows: If the body and axle parts are forced toward each other the lever frame 8$^c$ is rocked from position, b, (Fig. 17) toward the position, c, (see Fig. 19) thus flexing the lower supplemental leaf spring 3$^c$ upwardly against the lower side of the main leaf spring 1. The resistance thus interposed to the relative approach of the parts is reinforced by a direct compression of the upper supplemental spring 4$^c$ between the body frame—which is engaged with the pivot block 51 at the inner end of that spring—and the upwardly flexed extremity of the main spring. Under excessive shocks the elastic members 1 and 3$^c$ may be brought into substantially continuous pressure engagement—as shown in Fig. 19—and when this occurs the lever actuated flexure of the lower auxiliary spring will be arrested; and further approach of the body and axle members will be resisted in part by the continued positive flexure of the primary suspension spring 1 and in part by the accompanying increase in the direct compression of the secondary spring 4$^c$. When the parts return to the position of static equilibrium (Fig. 17) and begin to move away from each other—toward the rebound positions E—e indicated in dotted lines in Fig. 17—the tensioned links 23$^c$—23$^c$ exert an upward pull on the elbow joint of the toggle linkage 22$^c$—48 and thus produce an outward thrust on the lever bolt 26$^c$ which rocks the frame 8$^c$ downwardly and compresses the auxiliary spring 4$^c$ against the upper face of the main spring 1. This movement carries the lower bolt head, 38$^c$, away from the auxiliary spring 3$^c$, but the latter is not only prevented from expanding beyond its initially flexed position but is subjected to some added compression by the pull of the link connections 23$^c$ on the inner overhanging end of its pivot block support 50. If the recoil and rebound stress is very severe the upper supplemental spring may be flattened out into substantially continuous contact with the top surface of the main spring, and the lever frame will then be locked against further movement relative thereto; and any further separation of the body and axle members will then be very strongly resisted and quickly checked by the continued positive flexure of the main spring—which is being moved away from the axle member at its center and ends and pressed toward that member at its intermediate flexible portions—and by the cooperative bending of the lower supplemental spring 3$^c$ under the action of the rebound check connections 22$^c$—23$^c$—48.

All of the shock absorber organizations thus far considered are primarily designed for use on cross leaf spring suspension systems. I will now proceed to describe certain other illustrative embodiments of my invention which are more particularly adapted to different forms of side leaf spring supports.

The construction depicted in Figs. 20 and 21 comprises a main side-leaf-spring unit of the full elliptic type, and a lever-actuated system of counteracting-supplemental springs that are operatively interposed between the terminal eye connections at one of the apices of the main spring. The lever member itself consists of two side arms $8^d$—$8^d$ that are riveted or otherwise integrally secured to a triangular block $45^d$; and this block is pivotally mounted, on the cross bolt $47^d$, in the forked end of a bracket 52 which is bolted to the extremity of the upper semi-elliptic leaf element $1^{ss}$. The side arms $8^d$—$8^d$ are also joined together by the spacer bolt $11^d$, which forms a pivot connection between the lever and the eye end of the lower semi-elliptic leaf element $1^s$, and by the cross head $38^d$ that engages with the lower follower head $20^d$ of the supplemental compression spring $3^d$. The inner ends of the lever arms are curved or recessed to form hooks that are adapted to engage with a cross pin, $13^d$, which passes through the lower eye of the auxiliary expansion spring $4^d$. The upper ends of the two supplemental springs, $3^d$ and $4^d$, are both supported on the main-spring-body clip $7^d$; and are held under predetermined initial tension—the one by the stop bolt $17^d$, which prevents the compression spring from expanding, and the other by the stop bracket $28^d$, which also engages the cross pin $13^d$ and prevents the expansion spring $4^d$ from contracting, beyond the normal load position shown in Fig. 20. The lower extremity of the lever frame block $45^d$ is flexibly coupled to the main body clip ($7^d$) by means of the toggle link arms $22^d$—$48^d$, and the shackle and strap connectors $23^d$, which are so adjusted as to maintain these parts in tensioned engagement when the members are in static balance position (B—b).

When the system last described is subjected to a compressive shock, or other kinetic stress, which forces the two sides ($1^s$ and $1^{ss}$) of the elliptic spring toward each other, the lever frame $8^d$ is rocked in a counterclockwise direction and the parts assume the positions C—c that are shown in full lines in Fig. 21 and are partially indicated by dotted lines in Fig. 20. This movement compresses the supplemental spring $3^d$ until the central boss of the lower follower plate $20^d$ engages with the lower side of the clip support $7^d$; and after this occurs the further approach of the body and axle parts is resisted by the continued positive flexure of the main spring elements alone. When the parts return to normal load position the hooked ends of the arms $8^d$—$8^d$ engage the cross pin $13^d$, and the lever body connections, $22^d$—$23^d$, etc. are brought into operative relationship; and any rebound or separation of the spring connected members, (from the position B—b toward position E—e) imposes an outward thrust on the link $22^d$, thus rocking the lever frame $8^d$ in a clockwise direction and expanding the tension spring $4^d$, until the cross pin $13^d$ is brought into contact with the upper face of the main spring element $1^s$ (as shown in dotted lines in Fig. 20). This clockwise rotation of the lever frame forces the ends of the main spring elements, $1^{ss}$ and $1^s$, away from each other, and thus prevents the latter from recoiling beyond an unstressed or unloaded position and becoming subject to a negative flexure; and when the cross pin $13^d$ engages with the lower main spring member the lever frame and chassis parts—and the semielliptic leaf elements on which they are supported—are substantially locked against further separation by the tension of the tightly stretched band $23^d$.

In this construction—as in the ones previously considered—I preferably provide a rebound check supplemental spring unit which has a substantially greater resistance coefficient than the auxiliary compression unit; and I thus obtain a more powerful restraint, and an accelerated retardation, of the rebound movements as contrasted with the compression action of the system. The increased resistance coefficient of the tension spring $4^d$ is obtained, in part by making the coils thereof of smaller diameter (and if desired of stiffer material) than the coils of the compression spring $3^d$; and in part by so proportioning the rebound connections ($22^d$—$48^d$—$23^d$) between the lever and body members ($45^d$ and $7^d$) that a given movement of separation rocks the lever through a larger angle, and produces a corresponding greater flexure of the auxiliary spring, than is obtained by the same linear movement of compression. And in this construction—as in the first and third illustrative embodiments of my invention—the ratio of the opposite angular movements of the lever frame may be varied as desired by shifting the pivot bolt connection $26^d$ to different holes in the lever block $45^d$.

Figs. 22, 23 and 24 illustrate another application of my improved supplemental spring organization to a side leaf spring of the semi-elliptic form. In this exemplification of my invention the counter acting auxiliary springs consist of two highly resilient leaf springs, $3^e$ and $4^e$ which are bolted, at their outer ends, to the intermediate leg portion of an L shaped lever member $8^e$, and which are respectively engaged, at their other extremities, with a body bracket, $7^e$, and with the lower end of the links $28^e$ that are suspended from the said bracket. The downwardly turned foot and toe portions of the L shaped lever frame are pivotally connected to the forked end of a curved hanger iron 52ᵉ (by the pintle bolt 47ᵉ), and to the adjacent eye of the main spring 1ˢ (by means of the pintle bolt 11ᵉ and the shackle links 21ᵉ—21ᵉ); and the upwardly turned heel portion of this frame is flexibly coupled to the axle member of the vehicle by means of the cross bolt 26ᵉ, the rigid strap 22ᵉ, and the intervening turnbuckle-chain-and-sheave connections 23ᵉ—53. The inwardly projecting leg portion of the lever is forked, or divided, to receive, and closely embrace, the foliate edges of the supplemental leaf springs, 3ᵉ and 4ᵉ; and the extremities of these forks are provided with elongated and slotted heads 54—54, which are adapted to engage the projecting ends of pins 55 and 56 that are carried by suitable clips on the central parts of the said springs, and which limit the expansion or recoil movement of these elements in the manner hereinafter explained.

The mode of operation which characterizes the multiple leaf spring suspension shown in Figs. 22, 23 and 24 is essentially the same as that of the analogous cross leaf spring construction which is depicted in Figs. 17, 18 and 19. In the normal load position of static balance (B—b) the supplemental spring elements are confined under a predetermined initial flexure between the bracket 7ᵉ, and the lower end of the link frame 28ᵉ; and in this position of the parts the pins 55 and 56 are in engagement with the opposite ends of the slotted head 54; and the flexible connection 23ᵉ is under a slight tension. If now the body and axle parts are forced toward each other the lever member 8ᵉ is rocked in a counter-clockwise direction, from the position shown in Fig. 22 toward the one indicated in dotted lines (C—c) in Fig 23, and the upper auxiliary leaf spring 3ᵉ is progressively and increasingly flexed, until the heads 54 impinge against the under side of the body frame. The upward movement of the lever also raises the other auxiliary spring 4ᵉ— by the engagement of the pin 56 with the lower ends of the slotted heads 54—54 thus preventing the expansion or recoil of this secondary resilient element that might otherwise be permitted by the collapse of the suspension frame 28ᵉ. In order to ensure the proper closing movement of this frame I preferably connect the lower links thereof to a pivot clip on the end portion of the member 4ᵉ, and provide a light spring 57 which tends to press the upper links outwardly as the body frame moves toward the axle. When the parts rebound above the normal load position the relative separation of the body and axle parts impose a pull on the rebound-check connections (22ᵉ—23ᵉ—26ᵉ etc.), which rock the lever frame, 8ᵉ, in a clockwise direction and carry the parts toward the full line position (E—e) shown in Fig. 23. This movement imposes a greatly increased flexure on the lower supplemental spring 4ᵉ—the inner end of which is now held in fixed relationship with the body by the tensioned support 28ᵉ—and also carries the upper supplemental spring 3ᵉ away from the body bracket 7ᵉ, (by the engagement of the lever heads 54—54 with the pin 55), thus preventing the said spring from assisting in the upthrow of the body by a recoil action. The clockwise displacement of the lever also depresses the end of the main spring relatively to the body pivot bolt 47ᵉ, and thus tends to reduce the recoil of the primary suspension member, and to definitely limit the reflexing or expansion of this spring beyond its normal load form, under excessive rebound stresses. These concurrent and cooperative motions of the lever and spring members will ultimately bring the lower face of the element 4ᵉ into extended pressure engagement with the upper side of the main spring 1ˢ, and also bring the pins 56—55 into superimposed contact with the upper side of the lever heads 54 (as shown in full lines in Fig. 23); and when the parts reach these positions the interconnected lever and spring members are locked together; and any further separation of the body and axle frames is very strongly resisted by the semi-elastic yielding of the chain 23ᵉ and a very slight additional bending of the interlocked and mutually reinforced and stiffened suspension elements 1ˢ—3ᵉ—4ᵉ—8ᵉ etc.

All of the constructions thus far described are structurally characterized by the use of a single lever for reciprocally actuating and controlling the reverse flexures of the two supplemental spring units that respectively oppose the compression, and the expansion or rebound, of the system. But my invention is not restricted to such a structural combination: and I will now describe some additional illustrative embodiments thereof, in which separate lever members are provided for actuating the counteracting auxiliary springs, and subjecting them to any desired degree of relative flexure, when the body and axle members are displaced in opposite directions from the normal load position of static equilibrium. This species of construction—like the one first considered—may include a wide variety of different forms, that are particularly adapted for use with special types of main spring suspensions or with special designs of chassis frame construction.

The multiple-lever-auxiliary-spring combination illustrated in Figs. 25, 26 and 27 is primarily designed for use in conjunction with a three-quarter-elliptic, or semi-elliptic-scroll, spring support. In this exemplification of my improvements the adjacent eye ends of the lower main spring 1ˢ and of the body scroll spring 1ˢˢ, are operatively connected by the pivot bolts 11ᶠ and 47ᶠ and the interposed lever and shackle members 8ᶠ and 21ᶠ; and the compression-resisting-supplemental leaf spring 3ᶠ is bolted rigidly to the inner end of the lever 8ᶠ, and is engaged, at its opposite extremity, with the under side of the body frame. The rebound check auxiliary spring unit comprises a pair of helical coil tension springs 4ᶠ—4ᶠ, which are symmetrically disposed, one on each side of the spring 3ᶠ; and which are connected, at their extremities, with the body frame clip 7ᶠ and with the outer end of a second lever 58, that is also pivoted on the body bracket 59. The adjacent inner terminals of the two spring units, 3ᶠ and 4ᶠ, are flexibly connected by the shackle links 60—60, in the manner best shown in the detail cross sectional view of Fig. 27; and the intermediate part of the lever 58 is operatively coupled to the axle frame by means of the rocker arms 22ᶠ, and the pin and slot connections, 26ᶠ and 23ᶠ, as shown in section at the right hand of Fig. 25.

The functional action of the double-lever-counteracting spring mechanism last described is substantially the same as that of the single lever combinations that have been previously explained. When the parts are forced from the normal load position (B—b), shown in Fig. 25, toward the position of compression (C—c), depicted in Fig. 26, the lever 8ᶠ is rocked upwardly, and the supplemental spring 3ᶠ is subjected to an increased flexure, which bends it into a gradually increasing arc of contact with the under side of the body and thus interposes a geometrically progressive elastic resistance to the relative approach of the spring supported members. During this movement the second lever 58, and the rebound check auxiliary springs 4ᶠ, are held in fixed relation to the body frame by the links 60—60; and the coils 4ᶠ are thereby prevented from contracting beyond their initially tensioned position. But when the body and axle members rebound or separate from one another—from the position of static balance (B—b) toward the expanded position (E—e) which is indicated in dotted lines in Fig. 25—the pull of the tensioned link connections 22ᶠ rocks the lever 58 downwardly; and the supplemental springs 4ᶠ are subjected to a rapidly increased flexure until the end of the lever comes in contact with the upper face of the main spring 1ˢ. The downward motion of the member 58 carries with it the shackle links 60—60, and the end of the auxiliary leaf spring 3ᶠ connected thereto; and this action not only prevents any recoil of the said leaf spring from its initially flexed condition, but actually imposes some additional flexure thereon and thus enables it to effectively supplement the effect of the stretched coils 4ᶠ in restraining and rapidly arresting the rebound of the system. The clockwise movement of the lever-spring members, 8ᶠ—3ᶠ, also forces the eye extremity of the main spring toward the pivot bolt 47ᶠ; and this diminishes the recoil, and limits the reflexing or expansion, of the primary suspension element under excessive rebound stress. The elastic resistance coefficient of the lever-actuated-spring elements, 58—4ᶠ—4ᶠ and 60—3ᶠ, should be such that the greatest rebound stresses, to which the system may be subjected, will have been substantially compensated and absorbed by the extreme expansion movement indicated by dotted lines (E—e) in Fig. 25; for when this movement has taken place, and the end of the lever 58 has engaged the stiff central portion of the main spring, the elastically suspended parts will be locked against further separation by the non-resilient connections between the bracket 59 and the main spring axle block.

The kinematical arrangement of elements illustrated in Figs. 25 et seq. is capable of performing another function, and securing an added result, that has not heretofore been described in connection with the constructions depicted in Figs. 7 to 24 inclusive. When this last described construction is subjected to kinetic compression the pintle pin connection 26ᶠ slides outwardly in the slot 23ᶠ, which is of such curvature and contour that its sides are always inclined at a small angle to the kinematic axis of the arms 22ᶠ. When the return movement begins the pin 26ᶠ—which is preferably made of rectangular cross section as shown in Fig. 25—is brought into pressure engagement with the lower side of the slot 23ᶠ; and the frictional resistance to its inward and backward movement to normal load position (Fig. 25) imposes an immediate tension on the link connections 22ᶠ that serves to retard or damp the recoil and return of the parts toward normal load position. This tension in the links 22ᶠ also serves to exert a downward pull on the lever 58 and thus subjects the springs 4ᶠ to what has been termed a "prenormal" increase in stress—i. e. to an increase that is initiated before the parts have been returned to normal load position—and if this precursory increase is of sufficient magnitude it will result in a correspondingly advanced movement of the lever, and an accompanying elongation of these springs. Such an advanced movement of the lever member 58 also pulls the outer end of the leaf spring 3ᶠ away from the body frame before the said spring has returned to its normal load position, and thus further reduces the effect of that spring in producing a rebound or upthrow of the vehicle tonneau. The magnitude of these preliminary or prenormal actions of the rebound-checksystem may be widely varied by altering the form of the slot 23$^r$—so as to vary the angle of frictional contact between the lower edge of this slot and the pin 26$^r$—and by providing friction washers, or plates 61, that are interposed between the ends of the arms 22$^r$ and the adjacent faces of the lever 58, and are maintained in any desired pressure engagement with these parts by an adjustment of the nuts on the ends of the pin 26$^r$.

Figs. 28 and 29 illustrate another two-lever-double-spring exemplification of my improvements as applied to a rear cross leaf spring suspension of a Ford car. In this construction the compression-resisting supplemental spring consists of a flexible leaf element 3$^g$ which is bolted at its outer end to a short lever 8$^g$, and is engaged, at its inner end, by the upper cross bolt of a clip 7$^g$ that is secured to the central portion of the main spring. The lever 8$^g$ is rockably mounted on the axle perch bolt 11$^g$ and is recessed at its outer end to receive a bridge block 62, that is pivoted at its inner extremity on the bolt 11$^g$ (between the recessed sides of the lever), and is coupled at its outer extremity to the end eye of the main spring by means of the shackle links 21$^g$. The rebound-check-auxiliary spring consists of a volute coil 4$^g$ which is confined, under a predetermined initial tension, between the main spring clip 63, and the cupped head of a lever 58$^g$, that is pivotally supported on a bracket, 59$^g$, bolted to the differential gear case of the rear axle. The intermediate part of the lever 58$^g$ is coupled to the main spring clip 7$^g$ by means of the link arms, 22$^g$, and the split block and bolt connection 26$^g$ which slides on the segmentally ribbed portion 23$^g$ of the lever member (see enlarged sectional view of Fig. 30).

The operative elements of the combination now under consideration are so proportioned and adjusted that in the normal load position of the parts—shown in full lines in Fig. 28—the bridge block 62 is in pressure engagement with the outwardly projecting recessed end of the supplemental-spring-lever 8$^g$; and the head of the lever 58$^g$ rests on the main axle case or frame. The suspended parts are thus held in the position of static balance (B—$b$) by the combined reaction of both of the initially flexed auxiliary springs 3$^g$ and 4$^g$ on the main spring shackle and clip connections 21$^g$, 7$^g$ and 63. In this position of the parts the block 26$^g$ is drawn into contact with a fixed stop or shoulder at the inner end of the ribbed guideway 23$^g$; and the central portion of the initially flexed supplemental spring 3$^g$ rests lightly on the top of the clip 63. If now the body and axle parts are forced toward each other, by a kinetic increase in load stress, the pressure engaged lever members, 8$^g$—62, are rocked in a counter-clockwise direction and the auxiliary leaf spring 3$^g$ is correspondingly flexed to the form shown in dotted lines in Fig. 28. The relative approach of the body and main spring toward the axle frame also results in a direct compression of the second auxiliary spring 4$^g$, between the plate 63 and the fixed lever member 58$^g$; and this supplements the action of the more strongly flexed auxiliary element 3$^g$ in resisting and checking the compression of the system. During these movements the block connection 26$^g$ slides outwardly on the stationary lever members 8$^g$—23$^g$ until it engages with a stop or shoulder at the outer end of its guideway—as shown in dotted lines in Fig. 28—and thus arrests further approach of the main spring and axle parts. When the effects of the kinetic increase in load have been absorbed, and the elastically stressed members begin to recoil from their compressed position, the split block connection 26$^g$ is frictionally engaged with the lever guideway, 23$^g$; and the link connection 22$^g$ then exerts a downward pull on the main spring and body members, and a reversely directed or upward pull on the lever 58$^g$; and the auxiliary coil 4$^g$ is thereby subjected to a prenormal increase in flexural stress that reacts against the main spring, and the concurrently flexed supplemental spring 3$^g$, to damp or retard the return of the system to normal load position. The angular relation of the interconnected elements is such that the pull of the links, 22$^g$, on the block 26$^g$, will gradually move the latter inwardly toward the lever fulcrum support 59$^g$ and thus geometrically increase the effective restraint action of the lever-actuated-spring 4$^g$, as the recoil movement continues, until the block engages with the end of the ribs 23$^g$. If the rebound or expansion stress is sufficient to carry the parts above the point of static balance (B—$b$) toward the rebound position, (E—$e$), shown in Fig. 29, the volute coils of the auxiliary spring 3$^g$ will be further compressed against the lower side of the clip plate 63; and this action will exert an upward thrust on the outer flexible portion of the main spring that will lift the end thereof—(by rocking the pivoted bridge 62 away from the lever 11$^g$—and thus serve to arrest any sensible reflexing or expansion of the primary suspension member beyond its normally loaded form. This upward movement of the clip 63 and the main spring 1, will also increase the inital flexure of the auxiliary leaf spring, 3$^g$, and thereby cause this element to supplement the action of the lower spring, 4$^g$, in restraining and checking rebound. When the volute coils of the spring 4$^g$ have been compressed to their "nested" or "solid" condition, the lever, 58$^g$, the main spring 1, and the two supplemental springs $3^g$ and $4^g$, are all locked together into a mutually reinforcing semi-elastic group of elements that will very strongly resist any further separation of the body and axle parts.

Figs. 31, 32 and 33 illustrate another multiple-lever-controlled system of opposed, or counteracting, supplemental springs applied to a semi-elliptic side leaf spring suspension. In this embodiment of my invention the auxiliary resilient elements comprise two oppositely flexed leaf springs $3^h$ and $4^h$, that are respectively secured to the rigid lever members $8^h$ and $58^h$, and are engaged, at their reverse extremities, with the central and end portions of the main spring $1^s$. The lower member $8^h$ is pivotally mounted on the end of the body scroll iron $52^h$ and is provided with a "stop" flange 64, that limits the clockwise rotation of the lever on its mounting, and also with a slot $62^h$ that receives the ends of the lower cross bolt of a forked shackle link $21^h$. The upper cross bolt of this link is engaged with the end eye of the main spring $1^s$, and the link is also connected to the end eye of the upper rebound-check-auxiliary spring by means of a third pin bolt 65. The lever $58^h$—which controls the flexural movement of the last mentioned spring—is flexibly connected to the body bracket $59^h$, (by means of the shackle links 66—66); and is operatively coupled to the axle frame (by the swinging arms, $22^h$—$22^h$, and the sliding saddle and guide members $26^h$—$23^h$) in the manner previously described in detail in connection with Figs. 28–30. The body bracket $59^h$ is provided with a stop boss 67, which engages with the intermediate portion of the upper auxiliary spring $4^h$ and maintains the latter under a predetermined initial position when the parts are in the normal load position shown in Fig. 31.

The kinematical action of the last described organization is essentially the same as that of the cross leaf spring construction shown in Figs. 28 and 29; and the relative positions assumed by the parts in resisting and checking both compression and expansion movements of the system—and in counteracting recoil and preventing negative flexure or reverse bending of the main spring in connection therewith—are so clearly illustrated in Figs. 32 and 33 as to render any further explanation of this action unnecessary.

Fig. 34 depicts a structural modification of the general form of lever-spring mechanism that is shown in the three preceding illustrations. This modification is designed for use on a three-quarter-elliptic spring suspension, and comprises two auxiliary leaf springs, $3^i$ and $4^i$, which are respectively secured to two lever members $8^i$ and $58^i$, and are flexibly engaged at their eye ends with the body of the vehicle and with a shackle link, $65^i$, that is supported from the lever $8^i$. The lever member $8^i$ is pivotally connected to the eye end of the main spring $1^s$ by the cross bolt $11^i$, and to the extremity of the quarter-elliptic, or scroll, spring $1^{ss}$, by the forked shackle link $21^i$. The lever member $58^i$ is pivotally mounted, at an intermediate point of its length, on the bracket clip $59^i$ which is secured to the axle frame; and the inner end of the said member is operatively connected to the body frame by means of the swinging rod $22^i$, which is detachably engaged by a split collar $26^i$ that is loosely mounted in the conical recess $23^i$ at this end of the lever. The inner end portion of the auxiliary leaf spring $3^i$ is rigidly coupled to the central portion of the other supplemental spring $4^i$ by the links $60^i$.

When the parts are in the normal load position, indicated in full lines in Fig. 34, the lower end of the shackle connection $65^i$ bears on the adjacent upper face of the main spring; and both of the auxiliary springs $3^i$ and $4^i$ are maintained under mutually reactive initial tensions—by the cross connection $60^i$—which cooperate in balancing the static downward pressure of the body on the ends of the suspension elements $3^i$ and $1^{ss}$. If now the body and axle parts are forced toward each other, by an increased kinetic load stress, the lever $8^i$ will be rocked upwardly and the upper supplemental spring $3^i$ will be flexed into a progressively increased arc of contact with the underside of the body frame—as indicated by the upper dotted line $c$—$c$ of Fig. 34— and the mutual approach of the spring supported members will concurrently produce (by the action of the connector $60^i$) a complemental flexure of the lower auxiliary spring $4^i$—as indicated by the lower dotted line $e$—$e$ of this same figure—and these concurrent flexures of both supplemental springs will cooperate with the action of the main spring supports $1^s$ and $1^{ss}$ in effectively constraining and controlling the compression of the system by a geometrically increased elastic resistance thereto. As the parts move toward each other the rod $22^i$ will slide freely through the split clamp block $26^i$; but when the reverse movement begins— under the recoil stress of the compressed spring supports—the said block will be drawn into pressure engagement with the inclined walls of the conical recess $23^i$, and will grip the surface of the connector $22^i$; and the continuation of the return movement will produce a frictional drag on the axle block and main spring assemblage which will resist this movement, and will also produce, or tend to produce, a counterclockwise rotation of the lever $58^i$, and a corresponding bending of the auxiliary leaf springs $4^i$ and $3^l$, that will retard or damp the recoil action and reduce or eliminate the subsequent rebound or upthrow beyond the normal load position. But if the parts are subjected to an expansion stress that will move them beyond the point of static balance (B—$b$) the pull of the connector $22^l$—(which will be brought into positive engagement with the lever $58^l$ when the nut at the lower end of this rod comes in contact with the said lever)—will bend the lower auxiliary leaf spring into contact with the upper face of the main spring (as shown by the lower dotted line $e$—$e$ of Fig. 34); and this downward movement will be communicated in part to the upper auxiliary leaf spring $3^l$ by the pull of the links $60^l$; and will correspondingly bend this element away from the upwardly moving body frame (as indicated by the upper dotted line $c$—$c$ of Fig. 34). These concurrent flexures of the two supplemental springs will interpose a geometrically increased elastic resistance to rebound movement which may be made much greater than the reverse resistance, to closing or compressive movement, by a suitable proportioning of the power arms of the two lever members $58^l$ and $8^l$; and the downward pressure of the flexed supplemental spring system on the outer portions of the main spring $1^s$ will tend to directly restrain the upthrow of the primary suspension member and definitely limit the reflexing or expansion thereof by extreme separation of the body and axle frames.

In Figs. 35, 36 and $36^a$ I have illustrated an application of the second species of my invention to a cantilever spring suspension for the axle member. In this type of suspension the primary resilient element is a substantially flat leaf spring, $1^x$, which is bolted, at its base, to the body frame and is pivotally connected, at its flexible end, to a bearing block on one of the axle frames. In applying my invention to such a construction the main spring is somewhat shortened and stiffened—(e. g. by cutting off the single leaf portion which is ordinarily connected to the axle block)—and is coupled to the vertically oscillating wheel support by means of a rocking lever member $8^k$, and the pintle bolt and clip-block connections $11^k$ and 68. The lever $8^k$ carries a supplemental leaf spring 3 which bears at its free end on the upper surface of the main leaf spring $1^x$. A second auxiliary leaf spring, $4^k$, is secured, at one end, to a rigid base $58^k$, that is pivoted on the body bracket $59^k$; and this spring is also engaged, at its opposite free end, with the relatively stiff base or body portion of the primary suspension member.

The supplemental springs $3^k$ and $4^k$ are both maintained under predetermined initial flexures—which cooperate in the support of the parts in static balance under normal load pressures—by the contact of the enlarged head of base member $58^k$ with the body frame, and the engagement between this head and an upwardly projecting lug 69 on the lever element $8^k$. The two lever members, $58^k$ and $8^k$, are also conjoined, on opposite sides of their fulcrum supports, by means of the oscillating piston and dash pot connections which are best shown in the sectional views of Figs. 35 and $36^a$. These connections comprise a pair of arms $22^k$—$22^k$ which are pivotally secured to the head of the lever member $58^k$ and which terminate in a cylinder $26^k$; and a hollow plunger $23^k$ which is pivoted on the boss 70 of the other lever $8^k$. The lower end of the plunger element is provided with a loosely fitting cap 71 which is held in place by a light spring 72; and the space between the cylinder and plunger parts is filled with a heavy oil or light grease like that used in transmission gear cases.

The operation of the above described organization is as follows: When the system is subjected to a kinetic compression, the body and main spring will move downwardly with respect to the axle, and the lever $8^k$ will be rocked in the direction of the arrow $b$—$c$, thus bending the spring $3^k$ into a continually lengthening arc of contact with the top of the cantilever support $1^x$, and interposing a geometrically progressive resistance to the compression movement. This action will continue until the lever $8^k$ has moved through the angle $b$—$c$, and the supplemental resilient element $3^k$ has been flattened out against the upper surface of the main spring element $1^x$;—as shown in dotted lines, $C$—$c$, of Fig. 34—and after this occurs the further approach of the body and axle parts will be very strongly resisted by the unitary flexure of these superimposed and mutually interlocked and reinforced suspension members. During the compression movement the cylinder $26^k$ will slide downwardly over the plunger $23^k$; and the valve 71 will open to allow the liquid within the plunger chamber to flow into the lower end of the depressed cylinder. When the reverse movement begins the valve 71 will close, and the body of liquid thus trapped between the ends of the members $26^k$ and $23^k$ will act as a liquid clutch coupling which will exert a frictional drag on the separation of the body and axle parts (with which the members $22^k$ and $23^k$ are respectively connected); and which will also transmit the recoil motion of the lever-spring-unit $8^k$ to the lever $58^k$ and thereby impose a prenormal stress on the auxiliary rebound-check spring $4^k$. These actions will result in a pronounced slowing down or damping of the return of the compressed suspension members to the position of initial static balance; and these retardation effects can be regulated by controlling the leakage of the dash pot liquid past the closed valve 71, either by providing a small hole 73 therein, or by varying the viscosity of the fluid. When the parts have returned to normal load position the plunger $23^k$ will ordinarily have reached the bottom of the cylinder $26^k$; and any rebound or expansion movement, beyond this position, will be resisted by the action of the longitudinally locked connections, ($22^k$—$26^k$—$23^k$), which results in a concurrent clockwise rotation of both lever members $58^k$ and $8^k$ and a cooperative flexural bending of the associated supplemental springs $4^k$ and $8^k$ against the convex upper surface of the main spring $1^x$. In this phase of the operation the rebound-check unit, $4^k$, is subjected to a greater flexure than the supplemental compression-check-unit $3^k$; and its effective flexural length is also progressively shortened as the expansion movement continues—as shown in Fig. 36—so that the expansion of the suspension system is more strongly resisted and more quickly checked than the compression thereof; and if the rebound or separation of the body and axle frames is excessive the three superimposed springs $4^k$, $3^k$ and $1^x$ will be locked together over a considerable part of their length and will then act as a strongly reinforced and very stiff unitary restraint element. And it will be further noted that in this movement of rebound—as in the reverse movement of compression—the pressure of the supplemental springs on the upper convex surface of the main spring tends to straighten out, or increase the curvature, of the primary suspension member, and thus limit its reflexion or expansion under recoil stresses.

All of the previously described embodiments of my invention have been characterized by the use of lever elements for effecting and controlling—and in general magnifying—the flexural, or elastic restraint, action of both the compression-resisting and the rebound-check supplemental spring elements. But my invention may be also utilized in other structural combinations in which either one or both of the auxiliary suspension springs may be directly actuated by the approach or separation of the relatively movable chassis parts, without the intervention of any lever connections, or equivalent devices. The final sheet of my drawings illustrate several forms of this third species of my improved multiple spring construction as applied to different types of main spring suspension systems.

Figs. 37 and 38 depict a cross leaf spring support, for the front axle of a Ford car, in which the end of the main spring 1 is directly suspended from, and supported on, a single volute coil spring, $3^l$, which is mounted on the recessed base 75 of a forked axle perch, and is connected to the eye of the primary resilient element by means of the following plate $20^l$, the bolt $17^l$, and L-shaped shackle links $21^l$ (as best shown in section at the left of Fig. 37). The lower end of the bolt $17^l$ has an enlarged head which is adapted to engage with the base plate 75, and prevent the supplemental suspension coil $3^l$ from expanding beyond its position of predetermined initial flexure; and this head is provided with an arcuate slot $62^l$, which engages the central portion of a cross bolt, 76, that connects the upper ends of the shackle links $21^l$ to the forked eye of a radius or guide arm 77. The lower extremities of the shackle elements are coupled to the eye of the main spring 1 by means of a second cross bolt, and are also coupled to the end of another auxiliary leaf spring $4^l$ by a third cross bolt $65^l$. The inner, or base, portion of the supplemental spring $4^l$ is bolted to a short lever $58^l$, which is flexibly coupled to the axle block $59^l$ by the shackle links $66^l$, and which is operatively connected with the stiff central portion of the main spring 1, by means of the swinging links, $22^l$—$22^l$, and the grooved block, $26^l$, that slides on the upper leaf of the said main spring. The lever member $58^l$ is also provided with a boss or lug $67^l$ which is adapted to make contact engagement with the axle frame and limit the downward movement of the lever on its inner pivot support.

When the members are in normal load position, the auxiliary springs $3^l$ and $4^l$ are both maintained under a predetermined initial tension or strain which is sufficient to balance the downward pressure of the load on the shackle connections $21^l$. When this load stress is increased the body and main spring move toward the axle frame—as indicated by the dotted lines C—c of Fig. 37—and the supplemental resilient elements are concurrently subjected to an increased flexure; but the major portion of the resultant elastic resistance is furnished by the compression of the volute coil spring $3^l$. This direct compression of all the elastic suspension members may continue until the lower edge of the radius guide arm 77 comes in contact with the base of the axle perch on which it is pivoted; but after this occurs further flexure of the auxiliary springs $3^l$ and $4^l$ is arrested, and the continued compression of the system is restrained and controlled by the bending of the main spring alone. During these phases of the operation the lever member $58^l$ is held in fixed angular relation to the axle frame; and the arms $22^l$ and the bearing block $26^l$ move outwardly—under the joint influence of gravity and of a light "take up" spring 57¹—toward the inclined position, c—c of Fig. 37. When the compressive movement is arrested and the parts begin to recoil toward normal load position the groved block 26¹ grips the surface of the upwardly moving main spring, and exerts a pull on the arms 22¹ which frictionally resists this reflex upward motion of the primary suspension member, and which also tends to rock the lever 58¹ in a clockwise direction and thereby increase the positive flexure of the auxiliary leaf spring 4¹. This action restrains and retards the upthrow of the body frame, without interfering with the free return of the outer shackle link connections, (21¹—17¹), and of the auxiliary coil spring (3¹), to the normal load position. As the prenormal action of the rebound-check mechanism continues the block 26¹ is gradually drawn inward until it is brought to rest, in normal load position, against the end of the central leaf plate of the main spring (as shown in full lines in both Figs. 37 and 38) and when the body and axle parts are further separated, the lever 58¹ is positively rotated on its shackle pin support, and the auxiliary spring 4¹ is rapidly flexed into a progressively lengthened arc of contact with the lower face of the main spring (as shown in Fig. 38). This action produces a geometrically accelerated increase in the elastic resistance of the system to expansion movements, and quickly arrests any displacement of the body frame under the influence of rebound stress. The rapidly accelerated reactive pressure of the lower spring against the outer flexible portions of the main spring also results in an upward movement of the eye end of the primary suspension member—which is permitted by the free upward motion of the shackle and guide arm connection (21¹—77) in the arcuate slot 61¹—and thus prevents the complete reflexing and occasional reverse bending to which that member is usually subjected by the upthrow of the body frame.

Figs. 39 and 40 illustrate another application of the last described species of my improvements to the rear cross leaf spring support of a Ford car. As here shown the compression-resisting-supplemental-spring, on which the end of the main spring 1 is directly suspended, consists of a pair of coaxial coils 3ᵐ—3ᵐ that are mounted in a closed casing which is partially filled with a heavy oil or grease. This casing comprises an outer tubular member 79, which is screwed into the recessed head 75ᵐ of the axle brake drum perch, and is provided at the top with an inturned flange and with a pair of vertically slotted side arms 80—80; and an inner cap 20ᵐ, which has an upwardly projecting head 81, and which is also provided with a spring closed vent 82 that opens outwardly for the purpose of permitting the free escape of air from the casing. The cap head 81 is engaged by the central portion of a long cross bolt, 83, which passes through the slots 62ᵐ of the arms 80—80, and is connected at its extremities with the vertical links 17ᵐ—17ᵐ; and these links are connected, in turn (by another cross bolt) to the inner end of a rocking guide arm 77ᵐ and to the upper ends of the main spring shackle links 21ᵐ—21ᵐ. The lower side of the main spring eye—(which is pivotally coupled to the links 21ᵐ—21ᵐ)—is engaged by the flexible extremity of a long two-leaf-spring 4ᵐ, which is secured to a nonresilient lever member 58ᵐ, and is provided with a button clip 67ᵐ that normally rests on the main axle frame. The lever 58ᵐ is pivotally mounted, at an intermediate point on its length, on the main spring clip 7ᵐ; and is operatively coupled at its inner extremity to the axle case bracket 59ᵐ by means of the sliding bolt and wedge grip connections 22ᵐ—26ᵐ.

The functional action of the rear axle suspension system, shown in Figs. 39 and 40, is similar to that of the front axle suspension last described. When the body and axle members are moved toward each other—from the normal load position shown in full lines (B—b) toward that shown in dotted lines (C—c) of Fig. 39—the supplemental springs 3ᵐ and 4ᵐ are both increasingly flexed until the guide arm 77ᵐ comes into engagement with the lower part of its axle perch support (or the cross bolt 83 engages with the bottom of the slots 62ᵐ); but after this occurs the compression of the coils 3ᵐ—3ᵐ is arrested, and any further approach of the relatively movable parts is resisted by the continued cooperative flexure of the mutually connected main and auxiliary leaf springs 1 and 4ᵐ; and this second phase of the closing movement may continue until the inner ends of the lever arms 58ᵐ strike the top of the axle bracket 59ᵐ. In the compression of the system the rods 22ᵐ slide freely through the split cone grips 26ᵐ; but when the return movement begins the said grips are frictionally engaged with the said rods, and the recoil action of the system is retarded and damped in the manner heretofore explained. In the case of this construction the restraint imposed on the recoil of the leaf spring members, 1 and 4ᵐ, by the prenormal action of the rebound-check-element, is supplemented by a pneumatic pressure check on the recoil of the auxiliary coil springs 3ᵐ, which is produced by the action of the spring valve 82. When the coils are compressed by the downward movement of the cap 20ᵐ the valve opens and allows the air above the liquid packing in the lower cell to escape; but when the compression stress on the cap connections is removed the sudden recoil of the enclosed springs is prevented by the formation of a partial vacuum within the expanding cell. When the parts have all been gradually returned to the original position of static balance (B—b)—under the combined frictional and elastic damping action of the antecedent, or prenormally imposed restraints last described—the nuts at the lower ends of the rods $22^m$ will be in positive engagement with the axle bracket $59^m$; and when the body and axle members are further separated the supplemental spring $4^m$ will be quickly flattened out against the lower side of the main leaf spring support 1 (as shown in Fig. 40); and any recoil or reverse bending of the primary suspension member will be prevented by the upward pressure on the outer portions thereof, and the resultant free upward movement that is permitted by the slots, $62^m$.

Figs. 41, 42 and 43 depict an application of a directly-actuated-counteracting-spring suspension to a semi-elliptic side leaf spring support. In this exemplification of my improvements the eye of the main spring $1^s$ is connected to the adjacent end of the body bracket, $52^n$, by a supplemental spring shackle which comprises; an upper head 85 which is provided with slots $62^n$ to engage the laterally projecting ends of the bracket pin $47^n$; a lower head 86 which is pivotally connected to the end eye of the main spring $1^s$ by the shackle pin $11^n$, and a pair of coil sprigs $3^n$—$3^n$ which are interposed between the heads 85 and 86—on opposite sides of the main spring and body bracket $52^n$—and which are held against expanding beyond the point of predetermined normal load compression by the adjustable stop bolts $17^n$—$17^n$. In order to fully enclose and protect the springs $3^n$, and maintain the axial alignment of the relatively movable parts of the spring shackle, the lower head 86 is provided with tubular extensions 87 which slide smoothly in cooperating recessed portions of the upper head 85 (as shown in Figs. 42 and 43); and the chambers at the bottom of the head 86 may, if desired, be partially filled with oil or grease. The ends of the main spring pintle pin $11^n$ are also connected to one extremity of a rebound-check suspension spring $4^n$ by the links 88—88 and a recessed head $13^n$; and the opposite extremity of the second auxiliary suspension element is engaged by another recessed head $42^n$, that is provided with an extended hub portion 89. Both of the heads $13^n$ and $42^n$ are centrally perforated to receive a rod $23^n$, which carries a fixed collar or stop 90 that is adapted to engage the end of the hub 89; and the inner end of this rod is pivoted on the elbow pin of a toggle joint linkage $22^n$—$48^n$ that connects the body bracket $49^n$ with the axle frame. The hub 89 is conically bored to receive a split collar $26^n$ that is pressed lightly against its seat by the spring 91; and the heads $13^n$ and 89 are prevented from separating—when the rod and collar 90 are disengaged from pressure engagement with the collar and hub elements ($26^n$ and 89)—by the stop connector $28^n$.

The operation of this double supplemental-spring-suspension construction is as follows: When the suspended parts are subjected to a kinetic load stress, the shackle pin connections $11^n$ and $47^n$ will be forced toward each other; and the interposed suspension springs $3^n$ will be subjected to a correspondingly increased flexure. This direct compression action on the supplemental resilient elements $3^n$ will continue until the adjacent ends of the upper and lower head members, 85—86—87, come in contact; and when this occurs the pressure engaged members act like a solid non-resilient shackle link and further approach of the body and axle members is resisted by the flexural bending of the main spring alone. During this movement the toggle link arms, $22^n$—$48^n$ will be pressed toward each other and the rod $23^n$ will be drawn inwardly; while the links 88 and the connected heads $13^n$ and $42^n$ will be drawn downwardly and outwardly by the increased deflection of the main spring $1^s$ (see dotted line positions C—c—c of Fig. 41). These conjoint reverse movements pull the split collar $26^n$ away from its seat and allow the rod $23^n$ to slide freely therein. When the compression of the system has been arrested, and the members begin to return to their normal load position, the collar $26^n$ is pushed against its seat and is caused to grip the rod $23^n$; and the straightening out of the toggle linkage, $22^n$—$48^n$, imparts an outward thrust to the frictionally engaged parts, $23^n$, $26^n$—$42^n$, which imposes a frictional resistance to the return movement, and which also tends to compress the rebound-check-suspension spring $4^n$ and thereby retard and damp the free recoil action of the compression-resisting springs $3^n$—$1^s$. When the body and axle members have been restored to the position of static equilibrium, the collar 90 is in direct contact engagement with the auxiliary spring head $42^n$—89; and any rebound of the members above that position is then directly and strongly resisted by the accelerated opening movement of the toggle linkage $22^n$—$48^n$, and the resultant outward compression of the coil $4^n$ against the opposing main spring connections $13^n$—88. This outward pressure on the auxiliary suspension spring $4^n$ is thus transmitted directly to the end eye of the primary suspension member and acts to restrain the reflex or expansion movement thereof, and to prevent any reverse or negative bending of that member, even when the upward movement of the body frame is so great as to bring the pintle pin $47^n$ into pressure engagement with the upper ends of the slots $62^n$, and thus impose a direct rebound stress on the eye of the main spring. For when the rebound is so excessive as to compress the auxiliary spring $4^n$ to its maximum limit of movement, the links $22^n$ and $48^n$ are drawn into substantial alignment and then act to positively arrest any further separation of the body and axle frames to which they are respectively connected.

Fig. 44 illustrates the essential parts of another very simple form of double-supplemental-spring-suspension which is primarily designed for use on a three-quarter-elliptic-spring mounting, but which can also be readily utilized on other types of main spring supports. In the form shown the adjacent ends of the semi-elliptic-side leaf spring $1^s$ and of the quarter-elliptic scroll spring $1^{ss}$, are connected by a pair of spiral coil elements $3^o$, which are arranged one on each side of the main spring members and are coupled thereto, by the pintle bolt $11^o$ that passes through the end eye of spring $1^s$ and engages the central convolutions of the springs $3^o$, and by the bracket $52^o$ that is clamped to the outer convolutions of the spiral coils and to the adjacent eye end of the spring $1^{ss}$. The outer ends of the pintle bolt $11^o$ are connected to the bracket $52^o$ by a pair of slotted links $17^o$ which limit the contractile movement of the spiral coils, and maintain them under a predetermined initial flexure in the normal load position of the parts. The intermediate flexible portion of the main spring $1^s$ is coupled to the relatively stiff base portion of the associated member $1^{ss}$ by a direct acting rebound-check-suspension unit, which comprises; a clip $7^o$ that carries a swinging arm 92 and a stop rod $28^o$ that slides therein; a pair of shackle links 93—93 which are pivoted at their lower ends, to the head of the rod $28^o$, and at their upper ends to the bracket $49^o$ on the body spring member $1^{ss}$, and a helically wound tension spring $4^o$, which is secured, at its lower extremity, to the pivot support of the arm 92, and at its upper terminal, to the pintle connection between the rod $28^o$ and the links 93—93. The upper ends of the last mentioned members are preferably enlarged to form friction discs which are maintained in the desired pressure contact with the side plates 94 of the bracket $49^o$ by spring washers and nuts on the ends of the pivot bolt 95. A second tension spring $57^o$ is connected, at its inner end, to the lower portion of the links 93, and at its outer end, to a clip on the intermediate portion of the quarter-elliptic spring member $1^{ss}$.

The functional operation of the combination last described will be readily understood, by those skilled in this art. When the parts are in the normal load position of Fig. 44, the arms 92 and 93 are held in substantial alignment, and the rebound-check-spring is maintained under a predetermined initial tension—without exerting any pull on the pivot connections of the said arms—by the engagement of the stop rod $28^o$ with the end of the arms 92. When the body and axle parts are forced toward each other by a kinetic increase in load stress, the closing movement is resisted and taken up, in part by the radial compression of the upper portions of the supplemental spiral coils $3^o$—which is arrested at a predetermined point in this movement by the contact of the lower ends of the slotted links $17^o$ with the bracket support $52^o$—and in part by the progressive and cooperative flexure of the main spring suspension members $1^{ss}$ and $1^s$. During the closing movement the rebound-check-members 92—$28^o$, and 93, are carried toward the positions C—c—c indicated in dotted lines in Fig. 44, and the frictionally engaged elements on the axis of the pivot bolt 95 are rotated through a considerable angle with respect to each other. This action is assisted by the lateral pull of the spring $57^o$ on the link arms 93; and the initial tension of the said spring is preferably so adjusted that it will overcome the static friction between the parts of the relatively rotatable members, and will thereby eliminate any substantial resistance of this portion of the mechanism to small closing movements of the system. But when the compression due to a temporary increase in load stress has been arrested, and the recoil of the flexed suspension elements begins, the free return of the parts to the normal load position, (B—b), is retarded and damped by the frictional resistance of the pressure engaged arms and disc members 93—94, and by the supplemental elastic resistance of the tension spring 57 to direct elongation. This resistance to the straightening out of the link arms, 92—$28^o$—93, also tends to impose a precursory or prenormal increase of flexural stress on the coil element $4^o$; and as soon as the initial position of static balance (B—b) has been attained, any further separation of the body and axle members is directly resisted by the corresponding axial separation of the arms 92 and 93 and the resultant positive flexure of this supplemental rebound-check spring. During rebound movement the elastically coupled ends of the main spring members tend to approach each other and thus permit the joint recoil of the semi-elliptic spring $1^s$ and of the auxiliary spiral coils $3^o$—$3^o$; but in the present example of my improved construction this is prevented by the rebound-stop-action of the slotted connectors $17^o$—$17^o$; and the limited upthrow of the body, under the powerful restraining action of the tension coil 4°, is accompanied by only a restricted expansion or uncoiling of the outer flexible portions of the quarter-elliptic scroll spring 1ss, and does not result in any reverse or negative flexure on the primary suspension element of the system. In this respect the organization illustrated in Fig. 44 of my drawings presents the same generic characteristics of operation as are possessed by the first described embodiments of my invention, although the restrain against the reflexing or expansion of the main leaf spring beyond its normal load form is not quite as pronounced in this last exemplification of my improvements as it is in some of the other exemplary organizations hereinbefore considered.

All of the constructions illustrated in Figs. 7 to 44 inclusive are of the supplemental spring suspension type of structure, in which the auxiliary compression-resisting elements are interposed in series with the main spring support; and in which the secondary springs may therefore be flexed, either independently of, or concurrently with, the primary elastic element. This type of structure is the one which I prefer to use, as it possesses marked advantages over other arrangements in which the supplemental springs are mounted in parallel with the main spring, and can only act as a reinforcement thereof. But certain features of the improvements hereinbefore described may also be embodied in supplemental spring reinforcement systems; and Fig. 45 depicts one form or example of such embodiment.

In this final exemplification of my improvements the counteracting supplemental springs comprise; a pair of coaxial coils 3r—3r, which are interposed between a body bracket 96 and a plate 97 that normally rests on the axle frame; and a second pair of compression spring 4r—4r, which are enclosed in tubular sleeves 98—98, that are bolted to the axle frame, and slide through the projecting ends of the plate 97. The supplemental spring coils 3r—3r are maintained under a predetermined normal compression strain by the stop belt 17r which prevents the separation of the members 96—97 beyond the point shown in the figure; and the auxiliary rebound-check-coils, 4r—4r, are also maintained under initial compression by being confined between the lower follower plates 13r—13r (that rest on the upper surface of the main leaf spring 1s) and the upper follower heads 42r which are engaged by the inflanged ends of the sleeves 98—98. The lower follower plates 13r are operatively coupled to the body bracket 96 by means of the sliding bolt and socket connections 99—100.

When the parts of this supplemental-spring-reinforcement combination are subjected to compression, the members 96 and 97 are forced toward each other and correspondingly increase the flexure of the coils 3r—3r. When the closing stress is so great that it cannot be compensated and absorbed by the combined elastic resistances of the concurrently flexed main spring 1s, and the auxiliary springs 3r—3r, the body and axle members will continue their approach until the ends of the sockets 100 engage with the upper follower plates 42r; and after this occurs any further closing movement will be very strongly resisted by the combined action of the main spring and both sets of supplemental springs, 3r—3r and 4r—4r. When the body and axle members rebound or expand beyond the normal load position (B) the lower follower plates 13r and 97 are concurrently lifted, thus relieving the relatively movable members of any recoil pressure in the springs 3r—3r, and subjecting them to the restraint of the increasingly flexed springs 4r—4r. The action of these auxiliary rebound-check elements is not reinforced or assisted in any way by the main spring 1s; but it is opposed to any expansion or separation of the parts beyond normal load position, and therefore acts to resist the complete reflexing of the primary suspension member—and to prevent the subsequent reverse bending thereof—that ordinarily accompanies a violent upthrow of the body frame. This control of the recoil and rebound movements is particularly effective in this construction—as in the other exemplifications of my invention—because any desired degree of elastic restraint may be imposed on the rebound or separation of the body and axle members, without modifying or interfering with the sensitiveness of the supplemental spring system to light compressive shocks, and small closing movements; and in order to prevent any excessive recoil of the primary resilient element and of the parts supported thereby I prefer to make the auxiliary springs 4r—4r from much heavier, or stiffer, wire, than is used for the springs 3r—3r; and to also make the coils of the former somewhat smaller in diameter than the coils of the latter. It will also be noted that the rebound movement of the system is accompanied by a relative sliding motion of the members 97 and 98; and, if desired, these parts may also be utilized as friction check elements to supplement the action of the spring-check-unit in quickly restraining and absorbing the effects of rebound stresses. And it is also obvious that the relatively movable members 99 and 100, or 17r and 97, may be provided with coned friction grip collars and seats,—e. g., like those shown in Figs. 34, 39 or 41—or equivalent devices, for exercising a prelusory or prenormal frictional resistance to on the recoil and return of the members from compressed positions (C—c) to normal load position (B—b); and when this is done the supplemental spring reinforcement system last described will present both the generic and the the specific characteristics of functional action that are found in the several examples of supplemental spring suspension systems illustrated in Figs. 25 to 44 inclusive.

It will now be apparent, from the foregoing disclosure, that all of the features of structural and functional organization which characterize the various illustrative, or exemplary, embodiments of my invention—(as shown in Figs. 7 to 45 inclusive)—may be arranged and combined, inter se, in any desired or advantageous relationship; and may be utilized, in whole or in part, in a great variety of shock absorber mechanisms, which present different structural combinations and arrangements of parts and which differ in substitutive detail from those which are specifically depicted and described herein. For example: The structural combination of reversely acting compression and tension springs, $3^d$—$4^d$, shown in Figs. 20—21, may be readily substituted, when desired, for the corresponding combinations of two compression springs ($3$—$4$ ... $3^b$—$4^b$ etc.) as shown in Figs. 1 to 16 etc., (or vice versa); or the spiral coil suspension spring $3^o$ of Fig. 44 may be used in place of the helical coil suspension elements $3^l$, $3^m$, $3^n$, of Figs. 37 to 43 inclusive; or, as heretofore suggested, such forms of one way or lost motion connections, 22—23 ... $22^e$—$23^e$, .... 99—100 etc, as are illustrated in Figs. 1 to 24 and 45, may be replaced by the corresponding elements, $22^l$—$23^l$, $22^k$—$23^k$, $22^m$—$23^m$, or $22^n$—$23^n$, of Figs. 32, 35, 39 or 41; and many other exchanges and substitutions of equivalent elements—one for another—may be made without altering the generic functional character of the present invention. And with the preceding disclosure as a guide, engineers, who are familiar with vehicle construction, will also be enabled to adapt and apply my improvements to any desired arrangement of chassis frame members, and to any of the various types of main spring suspension—e. g. the cross leaf, the side leaf, the cantilever or the platform type—that are used in conjunction therewith.

What I claim is:

1. A shock absorber organization for vehicles which comprises, a set of counteracting spring units adapted to elastically restrain the movements of the vehicle parts in either direction from normal load position, means for definitely limiting the reflex movement of each unit and thereby preventing it from diminishing the positive restraint action of the other unit, and means for imposing a frictional restraint on the return movement of the said parts from one direction of displacement.

2. In a shock absorber for two relatively movable members the combination of a spring unit for elastically resisting the closing movement of the said members, another spring unit for elastically checking the separation of the said members, means for arresting the recoil of each unit at a fixed point in the movement thereof, and other means for subjecting one of said units to a frictionally imposed stress during the return of the members to normal load position.

3. A shock absorber for vehicles which comprises two oppositely flexed elastic supports for respectively resisting the approach and the separation of the body and axle members, means for preventing the expansion of either support beyond the predetermined initial flexure sufficient to maintain the said members in a position of static balance, and means for frictionally controlling the expansion movement of one of said elastic supports.

4. An elastic suspension system for two relatively movable members, which comprises, a spring unit for cushioning the approach of the said members, a second spring unit of greater resistance for checking the separation of the members, means for maintaining each of the said units under a predetermined strain at the position of normal load, and means for subjecting one of said units to an increased flexural stress before said normal load position is reached.

5. In an elastic suspension system for vehicles the combination of a main spring, a supplemental spring cooperating therewith to cushion and absorb compressive shocks, a second supplemental spring for resisting the separation of the body and axle members and preventing a negative flexure of the said main spring, means for arresting the reflexing of both supplemental springs beyond a predetermined point, and means for initiating an increased flexure of one spring before the reflex movement of the other has been arrested.

6. An elastic suspension system for vehicles which comprises a main spring, a supplemental spring cooperating therewith to restrain the relative approach of the body and axle members, an auxiliary spring for resisting the relative separation of the said members, and means conjoining said main spring and said auxiliary spring whereby the positive flexure of the latter is initiated before said members have returned to normal load position and the reflex movement of the former to said position is thereby restrained.

7. A spring suspension system for two relatively movable members which comprises a primary resilient support, a pair of auxiliary elastic units for respectively restraining the approach and the separation of the said members, and means for operatively connecting the auxiliary units with the said members whereby one of the said units is utilized in augmenting the positive flexural resistance of the said primary support and the other of the said units is utilized first restraining the return of the said support to normal load position and then checking the rebound movement thereof.

8. In a spring suspension for vehicles the combination of a primary elastic support, a supplemental elastic unit connected in series therewith to cushion and absorb compressive shocks, a second auxiliary unit for restraining and checking rebound movements and concurrently preventing negative flexure of the primary support, and means for arresting the recoil of each of the said secondary units at predetermined points in the flexural movement thereof.

9. A shock absorber organization for two relatively movable members which comprises a pair of counteracting spring units and means for connecting said springs with the said members whereby a displacement in either direction from normal position is resisted by a greatly increased positive flexure of one unit and by a lesser cooperative flexure of the other unit.

10. An elastic suspension system which comprises the combination of a main spring, a pair of counteracting supplemental spring units, and means conjoining said springs whereby the compression of the system is resisted by a major flexure of the main spring and one of the supplemental units and by a minor flexure of the second of said units, and whereby the reverse rebound of the system is restrained by the major flexure of the said second unit and the minor flexure of the other unit.

11. An elastic suspension system for vehicles which comprises a main spring, a relatively flexible compression resisting supplemental spring, a rebound-check auxiliary spring, a pair of stop elements for respectively maintaining each of said springs under a predetermined initial tension, and means for operatively connecting the said springs with the relatively movable members of the vehicle, whereby any displacement of the said members in either direction from normal load position is resisted by a major flexure of one and a minor flexure of another of the said springs.

12. A shock absorber organization for two relatively movable members which comprises the combination of a main spring, a pair of counteracting supplemental spring units of different elastic resistance, means for maintaining each of said units under a predetermined initial flexure when the members are in normal position, means for operatively connecting the said springs with the said members whereby any increased load stress is resisted and balanced by an increased flexure of the main spring and of the more flexible supplemental spring, and means whereby any reflex movement of the main spring is resisted by an increased flexural stress on the other more resistant supplemental unit.

13. An elastic suspension system for vehicles which comprises a main spring, a pair of major and minor auxiliary springs of different elastic resistance, means for maintaining the said auxiliary units under a predetermined initial flexure when the members of the vehicle are in normal load position, and means conjoining all of said springs with said members whereby any compression of the system will be accompanied by an increased flexure of the main spring and of the minor auxiliary spring, and any recoil of the system from its compressed position will impose an increased stress on the major auxiliary unit.

14. In a shock absorber organization for two relatively movable members the combination of a pair of counteracting spring units, and means conjoining said springs with said members whereby any movements of the latter under increased compression stress will be resisted by an increased flexure of one of said units, and any recoil movements thereof will be retarded by a frictional stress on the other unit.

15. In a shock absorber organization for vehicles the combination of a compression resisting spring, a rebound-check spring, means for maintaining both springs under a predetermined initial tension and preventing any expansion of said springs beyond said initially tensioned positions, means for imposing an increased flexure on the compression resisting spring when the vehicle members are moved from normal load position toward each other, and means for subjecting the rebound-check spring to an increased flexural stress as soon as the said members move in the reverse direction and thereby retarding the recoil action of the compression resisting spring.

16. In an elastic suspension system for two relatively movable members the combination of a main spring, a supplemental compression-resisting spring cooperating therewith to cushion the approach movements of said members, a rebound-check spring, means conjoining said last mentioned spring with the main spring and with the supplemental compression spring whereby the recoil movements of these latter elements are resisted and retarded by a frictionally developed stress imposed on the rebound-check spring when the movable members separate from one another.

17. A shock absorber organization for vehicles which comprises a primary spring member, a pair of counteracting secondary spring units cooperating therewith in elastically connecting and supporting the relatively movable vehicle parts, means for conjoining the secondary units with the said movable parts whereby any displacement of the latter from normal load position is accompanied by an increased flexure of both of the said secondary springs, and means for preventing any recoil of either of these flexed springs beyond the normal load form thereof.

18. A shock absorber system for two relatively movable members, which comprises the combination of a main spring, a pair of lever-actuated-supplemental spring units, means for conjoining said units with the said movable members whereby any displacement of the latter imposes an increased flexural movement on one of the supplemental springs when the members approach each other and a corresponding flexural movement on the other supplemental spring when the said members expand beyond normal load position; and means for limiting the flexural movement of each of the supplemental springs in both directions.

19. A shock absorber organization for vehicles which comprises the combination of a main spring unit, a plurality of counteracting supplemental spring units, a lever system for conjoining the main and supplemental units with the relatively movable members of the vehicle, stops for limiting the movement of the lever system with respect to the conjoined elastic elements and thereby arresting the lever actuation of the supplemental spring units, and means for preventing the expansion of the said units beyond the normal load form thereof.

20. In a shock absorber system the combination of a main spring unit, a supplemental compression-resisting unit, a supplemental rebound-check unit, a lever system for conjoining the said units, means for maintaining the supplemental units under a predetermined initial flexure and preventing their expansion beyond a normal position of static equilibrium, means for subjecting the main spring unit and the first mentioned supplemental unit to a progressively augmented strain when the system is compressed, and means for subjecting the rebound-check-unit to an increased strain when the compression movement is arrested and the reverse recoil movement is initiated and to a continually increased strain when the system is expanded beyond the aforesaid normal position.

21. In a suspension system for two relatively movable members the combination of a main spring, a supplemental compression-resisting spring, an auxiliary rebound-check spring, means for operatively connecting the said springs with the said movable members whereby any compression of the system is accompanied by a progressively increased flexure of the compression-resisting springs, and a one way clutch for alternately disconnecting and connecting the rebound-check-spring with one of the said movable members as the latter respectively approach and separate from one another, whereby the said check-spring is rendered inactive during compression of the system and is subjected to increased flexure during both the recoil and rebound portions of the expansion movements thereof.

22. In a shock absorber system for vehicles the combination of a main spring member, a supplemental compression-resisting member cooperating therewith in resisting the approach of the relatively movable vehicle members, an auxiliary rebound-check unit, means for holding this unit under a predetermined strain when the vehicle members are subjected to normal load, and a one-way connection conjoining the said unit and one of the said vehicle members and comprising a plurality of parts that are adapted to move freely with respect to each other during the compression and to be brought into operative engagement during the recoil and rebound of the system.

23. In a shock absorber system for vehicles the combination of a main spring, a plurality of supplemental springs, means conjoining said springs with the relatively movable members of the vehicle whereby the main spring and some of the supplemental springs are subjected to a progressively increased flexure when the system is compressed, means for holding the remaining supplemental springs inactive during such compression, and other means for operatively connecting the said remaining springs with a part of the system subject to recoil and rebound movements and imposing thereon a continually augmented restraint to all such movements.

24. A rebound-check mechanism for two relatively movable members which comprises a spring, means for holding this spring inactive when the members are moved from normal load position toward each other, and a one way clutch for operatively connecting the said spring with one of the said members when the latter return toward said position.

25. A rebound-check-mechanism for vehicles which comprises a spring, means for holding this spring inactive and under a fixed initial tension when the relatively movable members of the vehicle chassis are subjected to kinetic compression stress, yielding means for connecting said spring with one of the said members when the latter recoil from the position of compressive displacement, and a nonresilient means for positively conjoining the aforesaid spring and member when the vehicle parts rebound beyond their normal load position.

26. In a shock absorber organization for an elastic suspension system the combination of a compression-resisting element, and a rebound-check-mechanism which comprises a spring, a friction grip for yieldingly connecting said spring with one of the movable members of the system when the latter recoils from a compressed position, and a non resilient means for conjoining said spring with the said member when the parts of the system rebound beyond normal load position.

27. In a shock absorber organization for vehicles the combination of a main spring, a supplemental elastic unit cooperating therewith in resiliently cushioning and absorbing compressive shocks, and a rebound-check mechanism for resisting recoil and expansion movements, the said mechanism comprising a second supplemental spring, a yielding connection between one of the vehicle members and the said spring whereby the latter is subjected to an increased strain when the parts recoil from a compressed position, and a longitudinally rigid stop connection between the aforesaid member and spring whereby a progressively increased flexure is imposed thereon when the body and axle members rebound beyond the normal load position thereof.

28. An elastic suspension system for vehicles which comprises the combination of a main spring, a supplemental compression-resisting spring and a rebound-check spring, means for conjoining said springs with the relatively movable members of the vehicle whereby the compression of the system is restrained by the major flexure of the main spring and of the first mentioned supplemental spring and also by the minor flexure of the rebound-check spring, means for yieldingly connecting the last mentioned spring with one of the said vehicle members whereby the said spring is subjected to an increased stress when the compressed system recoils toward its normal load position, and nonresilient means for coupling the rebound-check spring to the relatively movable members when the latter separate, beyond the normal load position whereby such rebound movement is effectively resisted and the complete reflexing of the main spring is prevented by the progressively increased flexure of the rebound-check spring.

29. In a shock absorber organization for vehicles the combination of a main spring, a supplemental spring cooperating therewith in cushioning and absorbing compressive shocks, an auxiliary rebound-check mechanism which comprises an elastic resistance unit and a frictional resistance unit, and means for conjoining said units with the relatively movable members of the vehicle whereby the said elastic resistance is utilized to a minor degree in restraining compressive movement and to a major degree in restraining rebound movement of the said vehicle members, and the said frictional resistance is utilized in retarding the recoil of the compression cushioning elements to normal load position.

30. An elastic suspension system for vehicles which comprises a main spring, a plurality of supplemental leaf springs, means for conjoining said springs with the vehicle members whereby one of the supplemental leaf elements is increasingly flexed when the system is compressed and another of the said elements is correspondingly flexed when the system is expanded beyond normal load position, and means for arresting the recoil movement of each of the supplemental springs when said normal load position is reached.

31. In a shock absorber for two relatively movable members the combination of a main spring, a supplemental-compression-resisting leaf spring, an auxiliary rebound-check leaf spring, means conjoining the said springs with the said members whereby an approach of the latter is resisted by a major flexure of the two first mentioned elements and by a minor flexure of the last mentioned element, yielding means for connecting one of the vehicle members with the rebound-check-leaf spring and imposing an increased tension thereon when the parts recoil from the compressed to the normal load position, and a nonresilient means for connecting the aforesaid member and spring and subjecting the latter to a progressively increased flexure when the parts rebound beyond said normal load position.

32. A shock absorber construction for vehicles which comprises a plurality of leaf springs interposed between the body and axle members and arranged to conjointly resist any displacement of the said members from static equilibrium, means for interposing a damping resistance to the recoil of said springs from the position of displacement, and means for positively arresting any recoil of certain of the said springs beyond the initial position of static balance.

33. An elastic suspension system for vehicle bodies which comprises the combination of a main leaf spring unit, a plurality of supplemental leaf spring units of differing elastic resistance, means for conjoining the main spring and the more flexible of the said supplemental springs with the vehicle members whereby the compression movement of the latter will be gradually arrested by the joint flexure of the said conjoined springs, means for connecting the remaining supplemental leaf units with a part of the vehicle subject to rebound whereby the separation movement of the body and axle parts will be restrained and the reverse bending of the main spring will be prevented by the progressively increased flexure of the stiffer auxiliary elements of the combination, and means for positively arresting the expansion of all of the supplemental springs and maintaining them under a predetermined initial tension at the point of static balance of the system.

In witness whereof I have hereunto set my hand at Pittsburgh, Pennsylvania, this 12th day of January, A. D., one thousand nine hundred and twenty-one.

FRANK L. O. WADSWORTH.